United States Patent
Suzuki et al.

(10) Patent No.: US 12,291,642 B2
(45) Date of Patent: May 6, 2025

(54) INK JET RECORDING METHOD

(71) Applicant: FUJIFILM CORPORATION, Tokyo (JP)

(72) Inventors: Shota Suzuki, Kanagawa (JP); Kohei Takeshita, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 78 days.

(21) Appl. No.: 18/186,196

(22) Filed: Mar. 20, 2023

(65) Prior Publication Data

US 2023/0220227 A1 Jul. 13, 2023

Related U.S. Application Data

(63) Continuation of application No. PCT/JP2021/036014, filed on Sep. 29, 2021.

(30) Foreign Application Priority Data

Sep. 29, 2020 (JP) .................................. 2020-163386

(51) Int. Cl.
*B41M 5/00* (2006.01)
*B41M 7/00* (2006.01)
*C09D 11/38* (2014.01)

(52) U.S. Cl.
CPC ............ *C09D 11/38* (2013.01); *B41M 5/0047* (2013.01); *B41M 7/0081* (2013.01)

(58) Field of Classification Search
None
See application file for complete search history.

(56) References Cited

U.S. PATENT DOCUMENTS

| | | |
|---|---|---|
| 2013/0258017 A1 | 10/2013 | Kagose et al. |
| 2016/0031232 A1 | 2/2016 | Kagose et al. |
| 2017/0166766 A1 | 6/2017 | Sato et al. |

(Continued)

FOREIGN PATENT DOCUMENTS

| | | |
|---|---|---|
| CN | 106715508 A | 5/2017 |
| CN | 109661440 A | 4/2019 |

(Continued)

OTHER PUBLICATIONS

International Search Report issued in International Application No. PCT/JP2021/036014 on Dec. 14, 2021.

(Continued)

*Primary Examiner* — Scott A Richmond
(74) *Attorney, Agent, or Firm* — SOLARIS Intellectual Property Group, PLLC

(57) ABSTRACT

An ink jet recording method including a step of preparing an ink containing water and particles including a polymer P and a polymerizable monomer M wherein the polymerizable monomer M includes a monomer (M-1) having a viscosity at 25° C. of 500 mPa·s or less and a content of the monomer (M-1) relative to a total solid content of the particles is 25 mass % to 80 mass %; an application step of applying, onto a substrate, the ink by an ink jet process; and an irradiation step of irradiating the ink having been applied onto the substrate, with an actinic energy ray, wherein a time from landing of the ink onto the substrate to starting of the irradiation with the actinic energy ray is 1.00 second or less.

7 Claims, 1 Drawing Sheet

(56) References Cited

U.S. PATENT DOCUMENTS

| | | | |
|---|---|---|---|
| 2018/0009927 A1 | 1/2018 | Suzuki et al. | |
| 2018/0320017 A1* | 11/2018 | Umebayashi | C09D 11/107 |
| 2019/0169453 A1 | 6/2019 | Sato et al. | |
| 2020/0024468 A1 | 1/2020 | Koyama et al. | |
| 2020/0048487 A1 | 2/2020 | Koyama et al. | |
| 2020/0123401 A1* | 4/2020 | Il | B41J 2/01 |
| 2020/0140709 A1 | 5/2020 | Koyama et al. | |
| 2020/0190344 A1 | 6/2020 | Koyama et al. | |
| 2020/0230988 A1* | 7/2020 | Mizushima | B41M 5/00 |
| 2020/0392359 A1 | 12/2020 | Sato et al. | |

FOREIGN PATENT DOCUMENTS

| | | |
|---|---|---|
| CN | 110475829 A | 11/2019 |
| CN | 110475830 A | 11/2019 |
| CN | 111032794 A | 4/2020 |
| CN | 111051440 A | 4/2020 |
| JP | 2007-152767 A | 6/2007 |
| JP | 2007-204622 A | 8/2007 |
| JP | 2008-194827 A | 8/2008 |
| JP | 2009-221283 A | 10/2009 |
| JP | 2011-208088 A | 10/2011 |
| JP | 6047904 B2 | 12/2016 |
| JP | 6584677 B2 | 10/2019 |
| WO | 2016/151904 A1 | 9/2016 |
| WO | 2017/138434 A1 | 8/2017 |
| WO | 2019/188522 A1 | 10/2019 |

OTHER PUBLICATIONS

Written Opinion of the ISA issued in International Application No. PCT/JP2021/036014 on Dec. 14, 2021.

English language translation of the following: Office action dated Apr. 2, 2024 from the JPO in a Japanese patent application No. 2022-554073 corresponding to the instant patent application. This office action translation is submitted now in order to supplement the understanding of the cited reference which is being disclosed in the instant Information Disclosure Statement.

English language translation of the following: Office action dated Jun. 21, 2024 from the SIPO in a Chinese patent application No. 202180065536.X corresponding to the instant patent application. This office action translation is submitted now in order to supplement the understanding of the cited reference which is being disclosed in the instant Information Disclosure Statement.

Extended European Search Report dated Jan. 19, 2024, issued in corresponding EP Patent Application No. 21875748.2.

English language translation of the following: Office action dated Dec. 12, 2023 from the JPO in a Japanese patent application No. 2022-554073 corresponding to the instant patent application.

English language translation of the following: Office action dated Nov. 19, 2024 from the SIPO in a Chinese patent application No. 202180065536.X corresponding to the instant patent application. This office action translation is submitted now in order to supplement the understanding of the cited references which are being disclosed in the instant Information Disclosure Statement.

* cited by examiner

INK JET RECORDING METHOD

CROSS-REFERENCE TO RELATED APPLICATIONS

This application is a continuation application of International Application No. PCT/JP2021/036014, filed Sep. 29, 2021, the disclosure of which is incorporated herein by reference in its entirety. Further, this application claims priority from Japanese Patent Application No. 2020-163386, filed Sep. 29, 2020, the disclosure of which is incorporated herein by reference in its entirety.

BACKGROUND OF THE INVENTION

1. Field of the Invention

The present disclosure relates to an ink jet recording method.

2. Description of the Related Art

Various studies have been performed on ink jet inks and ink jet recording methods.

For example, JP6584677B discloses, as an ink jet ink composition that can form an image having high adhesiveness to a plastic substrate and has high dispersion stability, an ink jet ink composition containing water and particles including a chain polymer including a specific structural unit and a hydrophilic group and including a polymerizable group.

In addition, JP6047904B discloses, as an ink jet recording method that provides high curability, high fillability, high adhesiveness, and high ejection stability, an ink jet recording method including a first step of ejecting and landing, to a recording medium, from a head, droplets of a photocurable ink composition containing a solvent, a polymerizable compound, and a photopolymerization initiator, the polymerizable compound being particles dispersed in the solvent, to form an image, a second step of evaporating the solvent included in the photocurable ink composition constituting the image, and a third step of irradiating the image having been subjected to the second step, with light, wherein, at starting of the irradiation in the third step, the content of the polymerizable compound included in the photocurable ink composition constituting the image having been subjected to the second step, relative to the total mass of the ink composition, is 20 to 90 mass %.

In addition, JP2011-208088A discloses, as an actinic-energy-ray-curable composition or an actinic-energy-ray-curable ink composition that cures at high sensitivity even under low-power irradiation with an actinic energy ray, is less likely to cause seepage of surfactant, and exhibits high temporal stability, an actinic-energy-ray-curable composition containing (A) a polymerizable compound having an ethylenically unsaturated bond and being substantially insoluble in water, (B) a surfactant having one or more groups selected from the group consisting of acrylate groups, methacrylate groups, acrylamide groups, and methacrylamide groups, (C) a polymerization initiator, and (D) water. JP2011-208088A also discloses an ink jet recording method using the actinic-energy-ray-curable composition.

In addition, JP2008-194827A discloses, as an ink jet recording method that provides high ejection stability, high bleeding resistance for secondary colors, and high feathering resistance and that further provides good gradation properties, an ink jet recording method of ejecting an ink jet ink from an ink jet recording head to perform recording on a recording medium, wherein the ink jet ink at least contains a coloring material, a photoreactive resin, and water, and, after ejection of the ink jet ink to the recording medium and before a step of performing irradiation with an actinic energy ray, a volatile component contained in the ink jet ink is concentrated by drying means or permeation into the recording medium.

SUMMARY OF THE INVENTION

In an ink jet recording method in which an actinic-energy-ray-curable ink jet ink including a polymerizable monomer is landed to a substrate and the landed ink jet ink is cured by irradiation with an actinic energy ray to obtain an image, in order to, for example, improve the image quality of the image, the time from landing of the ink to the starting of irradiation with the actinic energy ray is shortened (for example, to 1.00 second or less) in some cases.

However, the present inventors performed studies and have found the following: in an ink jet recording method using an ink jet ink containing water and particles including a polymer and a polymerizable monomer, when the time from landing of the ink to the starting of irradiation with an actinic energy ray is shortened, the image quality of the image is not improved or the wear resistance of the image is also degraded in some cases.

Under such circumstances, the present disclosure has been made.

An object of an embodiment of the present disclosure is to provide an ink jet recording method by which an image having high image quality and high wear resistance can be recorded.

Specific means for achieving the object includes the following embodiments.

<1> An ink jet recording method including:
a step of preparing an ink containing water and particles including a polymer P and a polymerizable monomer M wherein the polymerizable monomer M includes a monomer (M-1) having a viscosity at 25° C. of 500 mPa·s or less and a content of the monomer (M-1) relative to a total solid content of the particles is 25 mass % to 80 mass %;
an application step of applying, onto a substrate, the ink by an ink jet process; and
an irradiation step of irradiating the ink having been applied onto the substrate, with an actinic energy ray, wherein a time from landing of the ink onto the substrate to starting of the irradiation with the actinic energy ray is 1.00 second or less.

<2> The ink jet recording method according to <1>, wherein the monomer (M-1) includes a monomer (M1A) having a viscosity at 25° C. of 150 mPa·s or less.

<3> The ink jet recording method according to <1> or <2>, wherein a total solid content of the particles in the ink at the starting of the irradiation with the actinic energy ray relative to a total amount of the ink at the starting of the irradiation with the actinic energy ray is 3 mass % or more and less than 20 mass %.

<4> The ink jet recording method according to any one of <1> to <3>, wherein the substrate has a surface on a side of landing of the ink, the surface having a temperature of 30° C. to 70° C. in the application step.

<5> The ink jet recording method according to any one of <1> to <4>, satisfying at least one of including a preheating step of heating the substrate before the application step, or performing, in the application step, heating of the substrate and application of the ink.

<6> The ink jet recording method according to any one of <1> to <5>, wherein, in the irradiation step, an irradiation energy of the actinic energy ray is 300 mJ/cm$^2$ or more, and a content of a liquid component in the ink after the irradiation with the actinic energy ray relative to a content of a liquid component in the ink before the irradiation with the actinic energy ray is 10 mass % or more.

<7> The ink jet recording method according to any one of <1> to <6>, further including a drying step of heat-drying the ink having been irradiated with the actinic energy ray.

<8> The ink jet recording method according to <7>, wherein, in the drying step, a content of a liquid component in the ink after the heat-drying relative to a content of a liquid component of the ink before the heat-drying is 2.0 mass % to 50 mass %.

An embodiment the present disclosure provides an ink jet recording method that enables recording of an image having high image quality and high wear resistance.

BRIEF DESCRIPTION OF THE DRAWINGS

FIG. 1 illustrates a character image used for evaluation of the image quality of images in EXAMPLES.

DESCRIPTION OF THE PREFERRED EMBODIMENTS

In the present disclosure, numerical ranges described as "a value 'to' another value" mean ranges including the value and the other value respectively as the minimum value and the maximum value.

In the present disclosure, the amount of each of components in a composition means, when the composition contains a plurality of substances belonging to such a component, the total amount of the plurality of substances in the composition unless otherwise specified.

In the present disclosure, among numerical ranges described in series, the upper limit value or the lower limit value of a numerical range may be replaced by the upper limit value or the lower limit value of one of other numerical ranges described in series, or may be replaced by a value described in Examples.

In the present disclosure, the term "step" includes not only an independent step, but also a step that is not clearly distinguished from another step but that achieves the intended result of the step.

In the present disclosure, "*" in chemical formulas represent bonding sites.

In the present disclosure, the concept of "images" encompasses, in addition to patterned images (such as characters, symbols, and figures), solid images.

In the present disclosure, "light" is a concept that encompasses actinic energy rays such as γ-rays, β-rays, electron beams, ultraviolet radiation, and visible radiation.

In the present disclosure, irradiation with an actinic energy ray may be referred to as "exposure".

In the present disclosure, ultraviolet radiation may be referred to as "UV (Ultra Violet) light".

In the present disclosure, light emitted from an LED (Light Emitting Diode) light source may be referred to as "LED light".

In the present disclosure, "(meth)acrylic acid" is a concept that encompasses both of acrylic acid and methacrylic acid; "(meth)acrylate" is a concept that encompasses both of acrylate and methacrylate; and "(meth)acryloyl group" is a concept that encompasses both of an acryloyl group and a methacryloyl group.

Ink Jet Recording Method

An ink jet recording method according to the present disclosure (hereafter, also simply referred to as "recording method") includes a step of preparing an ink containing water and particles including a polymer P and a polymerizable monomer M (hereafter, also referred to as "specified particles") wherein the polymerizable monomer M includes a monomer (M-1) having a viscosity at 25° C. of 500 mPa·s or less and a content of the monomer (M-1) relative to a total solid content of the specified particles is 25 mass % to 80 mass %;

an application step of applying, onto a substrate, the ink by an ink jet process; and an irradiation step of irradiating the ink having been applied onto the substrate, with an actinic energy ray, wherein a time from landing of the ink onto the substrate to starting of the irradiation with the actinic energy ray is 1.00 second or less.

As described above, the present inventors performed studies and have found the following: in an ink jet recording method in which an ink jet ink containing water and particles including a polymer and a polymerizable monomer is landed to a substrate and the landed ink jet ink is cured by irradiation with an actinic energy ray to obtain an image, when the time from landing of the ink to the starting of exposure is shortened (specifically, to 1.00 second or less), the image quality of the image is not improved or the wear resistance of the image is also degraded in some cases.

The reason for this phenomenon is inferred as follows.

In order to ensure the image quality and wear resistance of the image, it is inferentially important that, at the starting of exposure, the polymerizable monomer seeps to some extent from the particles and, during exposure, the polymerizable monomer having seeped from the particles is polymerized, so that curing between particles (in other words, bonding between particles) proceeds. When curing between particles proceeds, high strength of the film (image) is obtained and the wear resistance of the image is improved inferentially. In addition, when curing between particles proceeds, the ink on the substrate can be thickened to thereby improve the image quality of the image inferentially.

However, when the time from landing of the ink to the starting of exposure is 1.00 second or less, in the ink at the starting of exposure, seepage of the polymerizable monomer from particles is insufficient in some cases inferentially. As a result, curing within particles mainly proceeds and curing between particles (in other words, bonding between particles) becomes insufficient, which results in degradation of the image quality and wear resistance of the image in some cases inferentially.

For such problems, the recording method according to the present disclosure in which the time from landing of the ink to the starting of exposure is 1.00 second or less still provides an image having high image quality and high wear resistance.

The reason why such advantages are provided is inferred as follows.

The ink used in the recording method according to the present disclosure contains specified particles including a polymer P and a polymerizable monomer M. The polymerizable monomer M includes a monomer (M-1) having a viscosity at 25° C. of 500 mPa·s or less. The content of the monomer (M-1) relative to the total solid content of the specified particles is 25 mass % to 80 mass %.

In the ink, a relatively high content (specifically, 25 mass % or more) of the monomer (M-1) having a low viscosity (specifically, 500 mPa·s or less) is contained in the particles, so that, after landing of the ink, the monomer (M-1) effectively seeps out from the particles and hence curing between particles (in other words, bonding between particles) sufficiently proceeds inferentially. As a result, in spite of the feature in which the time from landing of the ink to the starting of exposure is 1.00 second or less, an image having high image quality and high wear resistance is obtained inferentially.

Note that the monomer (M-1) content of 80 mass % or less contributes to the ejection performance of the ink from an ink jet head and, due to the effect of the ejection performance, can also further contribute to the image quality and the wear resistance.

In the present disclosure, the total solid content of the specified particles means the total amount of the specified particles except for the solvent (specifically, water and the organic solvent). When the specified particles do not include solvents, the total solid content of the specified particles is the same as the total amount of the specified particles.

As described above, in the recording method according to the present disclosure, the time from landing of the ink to the starting of exposure is 1.00 second or less.

In the recording method according to the present disclosure, in addition to the feature in which the monomer (M-1) content relative to the total solid content of the specified particles is 25 mass % or more, the feature in which the time from landing of the ink to the starting of exposure is 1.00 second or less also itself contributes to improvement in the image quality of the image. The reason for this is that the ink having been landed to the substrate is exposed relatively rapidly (specifically, in 1.00 second or less), to thereby suppress movement of the ink having been landed to the substrate inferentially.

Hereinafter, steps that can be included in the recording method according to the present disclosure will be described.

Ink Preparation Step

This step is a step of preparing an ink used in the recording method according to the present disclosure.

The ink contains water and particles including a polymer P and a polymerizable monomer M (namely, specified particles), wherein the polymerizable monomer M includes a monomer (M-1) having a viscosity at 25° C. of 500 mPa·s or less, and the content of the monomer (M-1) relative to the total solid content of the specified particles is 25 mass % to 80 mass %.

This step may be a step of producing the ink or may be a step of simply preparing the ink having been produced in advance.

Preferred examples of the ink used in the recording method according to the present disclosure will be described later.

Application Step

The application step is a step of applying the ink onto a substrate by an ink jet process.

Substrate

The substrate used in the recording method according to the present disclosure is not particularly limited, may be an impermeable substrate or a permeable substrate, and is preferably an impermeable substrate.

The impermeable substrate used herein refers to a substrate having a water absorption (unit: mass %, measurement time: 24 hours) of less than 10 measured by an ASTM test method according to ASTM D570.

The above-described water absorption of the impermeable substrate is preferably 5 or less.

Examples of the impermeable substrate include:
paper laminated with a plastic (for example, polyethylene, polypropylene, or polystyrene), metal plates (for example, plates of a metal such as aluminum, zinc, or copper), plastic films (for example, films of polyvinyl chloride (PVC: Polyvinyl Chloride) resins, cellulose diacetate, cellulose triacetate, cellulose propionate, cellulose butyrate, cellulose acetate butyrate, cellulose nitrate, polyethylene terephthalate (PET: Polyethylene Terephthalate), polyethylene (PE: Polyethylene), polystyrene (PS: Polystyrene), polypropylene (PP: Polypropylene), polycarbonate (PC: Polycarbonate), polyvinyl acetal, or acrylic resins), paper laminated with or vapor-deposited with the above-described metal, plastic films laminated with or vapor-deposited with the above-described metal, and leathers.

Examples of the leathers include natural leathers (also referred to as "real leathers"), and synthetic leathers (for example, PVC (polyvinyl chloride) leather and PU (polyurethane) leather). For leathers, for example, reference can be made to Paragraph 0163 to Paragraph 0165 of JP2009-058750A.

For example, in the case of forming a film on a plastic film or a leather serving as an impermeable substrate (for example, a seat for a vehicle, a bag, a shoe, or a purse), the film is desirably formed to have high wear resistance and high adhesiveness.

Also, in the case of forming a film on a substrate other than leathers and plastic films, the film may be desirably formed to have high wear resistance and high adhesiveness.

The film-forming method according to the present disclosure can satisfy such desires.

The substrate may be surface-treated from the viewpoint of improving the surface energy.

Non-limiting examples of such a surface treatment include corona treatment, plasma treatment, flame treatment, heat treatment, abrasion treatment, light irradiation treatment (UV treatment), and flame treatment.

Ink Application Conditions Etc.

The ink application by an ink jet process can be performed by ejecting the ink from an ink jet head in a publicly known ink jet recording apparatus.

The ink jet head is preferably a piezoelectric ink jet head.

The ink jet head preferably has a resolution of 300 dpi or more, more preferably 600 dpi or more, still more preferably 800 dpi or more.

The dpi (dot per inch) used herein represents the number of dots per 2.54 cm (1 inch).

The drop volume (the drop volume per dot) of the ink ejected from the ink jet head is preferably 1 pL (picoliter) to 100 pL, more preferably 3 pL to 80 pL, still more preferably 3 pL to 50 pL.

Substrate Temperature Etc.

The substrate has a surface on the side of landing of the ink, the surface having a temperature of, in the application step, preferably 20° C. to 80° C., more preferably 25° C. to 75° C., still more preferably 30° C. to 70° C., yet more preferably 40° C. to 70° C.

When the substrate has a surface on the side of landing of the ink, the surface having a temperature of 20° C. to 80° C., the image quality and wear resistance of the image are further improved. The reason for this is that the effect of seepage of the monomer (M-1) from the specified particles is more likely to be provided inferentially.

Heating of Substrate

The recording method according to the present disclosure preferably satisfies at least one of including a preheating step of heating the substrate before the application step, or performing heating of the substrate and application of the ink in the application step.

This results in further improvement in the image quality and wear resistance of the image. The reason for this is that the effect of seepage of the monomer (M-1) from the specified particles is more likely to be provided inferentially.

When the recording method according to the present disclosure satisfies at least one of the above-described features, the temperature of the surface of the substrate is easily controlled to such a preferred temperature.

In each of the heating in the preheating step and the heating in the application step, heating means for heating the substrate is not particularly limited; examples include a heat drum, hot air, an infrared lamp, an infrared LED, an infrared heater, a heating oven, a hot plate, an infrared laser, and an infrared dryer.

Irradiation Step

The irradiation step is a step of irradiating, with an actinic energy ray, the ink having been applied onto the substrate (stated another way, a step of exposing the ink having been applied onto the substrate).

In this step, irradiation with an actinic energy ray (namely, exposure) is performed to polymerize the polymerizable monomer M in the ink to cure the ink, to provide an image. More specifically, as described above, after the ink is landed, the monomer (M-1) effectively seeps out from the specified particles, so that curing between specified particles (in other words, bonding between specified particles) sufficiently proceeds, which results in an image having high image quality and high wear resistance.

The actinic energy ray may be, for example, ultraviolet radiation (UV light), visible light, or an electron beam and is preferably, of these, UV light.

The ink having been applied onto the substrate may be irradiated with an actinic energy ray while the substrate and the ink having been applied onto the substrate are heated.

For irradiation conditions and basic irradiation methods using an actinic energy ray, the irradiation conditions and irradiation methods disclosed in JP1985-132767A (JP-S60-132767A) and Paragraph 0023 of JP2014-132081A can be applied.

In the recording method according to the present disclosure, as described above, the time from landing of the ink to the starting of irradiation with an actinic energy ray is short (specifically, 1.00 second or less).

The ink application and irradiation with an actinic energy ray according to such an embodiment are preferably performed using an ink jet recording apparatus including a unit including an actinic-energy-ray-irradiation ink jet head and an actinic-energy-ray source disposed near the ink jet head.

With this unit, after the ink is ejected from the ink jet head of the unit to land the ink to a substrate, at a timing in a short time of 1.00 second or less from the landing, irradiation with the actinic energy ray from the actinic-energy-ray source of the unit can be performed.

Examples of the light source for irradiation with an actinic energy ray include a mercury lamp, a metal halide lamp, a high-pressure mercury lamp, a medium-pressure mercury lamp, a low-pressure mercury lamp, an ultraviolet fluorescent lamp, a gas laser, a solid-state laser, an LED (light-emitting diode), and an LD (laser diode).

Of these, the light source for irradiation with an actinic energy ray is preferably a light source for irradiation with ultraviolet radiation that is a metal halide lamp, a high-pressure mercury lamp, a medium-pressure mercury lamp, a low-pressure mercury lamp, or an ultraviolet LED (hereafter, also referred to as UV-LED).

The peak wavelength of the ultraviolet radiation is, for example, preferably 200 nm to 405 nm, more preferably 220 nm to 400 nm, still more preferably 340 nm to 400 nm.

The peak wavelength of light (LED light) from the LED light source is preferably 200 nm to 600 nm, more preferably 300 nm to 450 nm, still more preferably 320 nm to 420 nm, yet more preferably 340 nm to 405 nm, still yet more preferably 355 nm, 365 nm, 385 nm, 395 nm, or 405 nm.

The UV-LED is, for example, a UV-LED manufactured by Nichia Corporation and having a main emission spectrum having a wavelength between 365 nm and 420 nm.

Another example is a UV-LED described in U.S. Pat. No. 6,084,250A and configured to emit an actinic radiation with a primary emission between 300 nm and 370 nm.

Some UV-LEDs may be combined to perform irradiation with ultraviolet rays in different wavelength regions.

The irradiation energy of the actinic energy ray (namely, exposure dose) is preferably 20 $mJ/cm^2$ or more, more preferably 100 $mJ/cm^2$ or more, still more preferably 300 $mJ/cm^2$ or more, particularly preferably 500 $mJ/cm^2$ or more, most preferably 900 $mJ/cm^2$ or more.

The upper limit of the exposure dose is not particularly limited and the upper limit may be 5 $J/cm^2$ or may be 1,500 $mJ/cm^2$.

The maximum illuminance of such an LED on the substrate is preferably 10 $mW/cm^2$ to 8,000 $mW/cm^2$, more preferably 20 $mW/cm^2$ to 5,000 $mW/cm^2$, still more preferably 30 $mW/cm^2$ to 3000 $mW/cm^2$, yet more preferably 50 $mW/cm^2$ to 1000 $mW/cm^2$.

The irradiation time of the actinic energy ray is preferably 0.01 seconds to 120 seconds, more preferably 0.1 seconds to 90 seconds.

Time from Landing of Ink to Starting of Exposure

In the recording method according to the present disclosure, the time from landing of the ink to the starting of exposure (specifically, the time from landing of the ink onto the substrate to the starting of irradiation with an actinic energy ray) is 1.00 second or less.

As described above, the feature in which the time from landing of the ink to the starting of exposure is 1.00 second or less contributes to improvement in the image quality of the image.

The lower limit of the time from landing of the ink to the starting of exposure is not particularly limited; the lower limit may be, for example, 0.01 seconds, 0.05 seconds, or 0.10 seconds.

Total Solid Content of Specified Particles in Ink at Starting of Exposure

In the recording method according to the present disclosure, at the starting of irradiation with an actinic energy ray (in the present disclosure, also referred to as "at the starting of exposure"), the total solid content of the specified particles in the ink relative to the total amount of the ink is preferably 3 mass % or more and less than 20 mass %.

The feature in which the total solid content of the specified particles in the ink at the starting of exposure is less than 20 mass % means the following: at the timing when the ink having been applied onto the substrate is insufficiently dried (specifically, including more than 80 mass % of water and/or a liquid component being a water-soluble organic solvent), the insufficiently dried ink is irradiated with an actinic energy ray. Such an embodiment of irradiation with an actinic energy ray more effectively achieve seepage of the monomer (M-1) and curing between specified particles, to thereby further improve the image quality and wear resistance of the image.

The total solid content of the specified particles in the ink at the starting of exposure is preferably 4 mass % to 19 mass %, more preferably 5 mass % to 15 mass %.

The total solid content of the specified particles in the ink at the starting of exposure can be controlled by adjusting, for example,
the total solid content of the specified particles in the ink to be ejected from an ink jet head,
the time from landing of the ink to the starting of exposure, or
the temperature of a surface of the substrate.

The total solid content of the specified particles in the ink at the starting of exposure is determined in the following manner.

Specifically, the total solid content (mass %) of the specified particles in the ink to be ejected is regarded as the total solid content (mass %) of the specified particles in the ink at the landing to the substrate, and
on the basis of the total solid content (mass %) of the specified particles in the ink at the landing to the substrate,
the drying rate (vol %/s) of the ink determined using a contact angle meter, and
the time from landing of the ink to the starting of exposure,
the total solid content of the specified particles in the ink at the starting of exposure is determined.

The drying rate (vol %/s) of the ink is measured using a contact angle meter.

For example, when ink droplets have a volume of 10 pL (droplet radius: 13.4 m), the drying rate (vol %/s) of the ink is determined in the manner of (1) to (4) below. The apparatus employed is FTA-1000 contact angle meter and a hot-water-circulation temperature-control stage manufactured by FTA Inc.

(1) The temperature-control stage is heated to a predetermined temperature and, for each of 0.5 μL (droplet radius: 492 m) and 1 μL (droplet radius: 620 m) ink droplets, the time-dependent change in the droplet volume is measured for 20 seconds. The time-dependent change in the droplet volume is determined on the basis of the time-dependent change in the contact angle.

From the gradient of the resultant linear relation (time vs droplet volume), the drying rate (vol %/s) in each of the droplet volumes is calculated.

(2) On the basis of the determined drying rate (vol %/s) and the droplet radius (492 μm or 620 μm), DGAS(Cv−Ca) and L are calculated by the following Formula (A).

$$J=DGAS(Cv-Ca)(1/R+1/L)$$ Formula (A)

[in the Formula (A), J represents the drying rate (vol %/s), DGAS represents the diffusion coefficient of the vapor phase, Cv represents the vapor concentration in the surface of the droplet, Ca represents the vapor concentration of the atmosphere, R represents the droplet radius, and L represents the thickness of the vapor diffusion layer]

(Source: "Applications & Materials of Inkjet Printer II", CMC Publishing Co., Ltd., 2007)

(3) DGAS(Cv−Ca) and L calculated in (2) above are substituted into Formula (A) and the resultant formula is used to calculate J (drying rate) of a 10 pL ink droplet (droplet radius: 13.4 m).

(4) J (drying rate) calculated in (3) above is used to calculate the evaporation amount of the liquid component (specifically, water and the water-soluble organic solvent) in the time from landing of the ink to the starting of exposure (specifically, the value of 1.00 second or less). On the basis of the determined evaporation amount and the total solid content of the specified particles in the ink at landing to the substrate (specifically, the total solid content of the specified particles in the ink to be ejected), the total solid content of the specified particles in the ink at the starting of exposure is determined.

Even when the ink droplet has a volume other than 10 pL, as in the case of 10 pL, the total solid content of the specified particles in the ink at the starting of exposure can be determined.

From the viewpoint of providing an ink jet recording method that enables recording of an image having higher image quality and higher wear resistance, in the irradiation step, for the irradiation conditions of the actinic energy ray, the irradiation energy of the actinic energy ray is preferably 300 $mJ/cm^2$ or more, and the content of the liquid component in the ink after irradiation with the actinic energy ray relative to the content of the liquid component in the ink before irradiation with the actinic energy ray is preferably 10 mass % or more, more preferably 20 mass % or more and 70 mass % or less, still more preferably 25 mass % or more and 60 mass % or less.

Hereinafter, in the irradiation step, the content of the liquid component in the ink after irradiation with the actinic energy ray relative to the content of the liquid component in the ink before irradiation with the actinic energy ray will also be referred to as "residual liquid-component content in the irradiation step".

The residual liquid-component content in the irradiation step is determined by individually determining the content of the liquid component in the ink before irradiation with the actinic energy ray and the content of the liquid component in the ink after irradiation with the actinic energy ray and by, on the basis of the resultant values, determining the residual liquid-component content.

For the content of the liquid component in the ink before irradiation with the actinic energy ray, the following is performed.

A sample obtained by performing, in the actual ink jet recording method, the ink preparation step to the application step is used as a measurement sample for the content of the liquid component in the ink before irradiation with the actinic energy ray (hereafter, referred to as the pre-irradiation sample). Note that, in the application step, the ink is applied so as to form a solid image having the shape of a 4 cm×4 cm square, irradiation with the actinic energy ray is not performed, and, even when heating is performed during application of the ink in the actual ink jet recording method, the substrate is not heated during application of the ink in the preparation of the measurement sample.

The content of the liquid component in the ink before irradiation with the actinic energy ray is determined by the same method as in the content of the liquid component in the ink before heat-drying (namely, the image) described later except that, instead of an image recorded product 1 described later, the pre-irradiation sample is used.

Specifically, by the same method as in the content of the liquid component in the ink before heat-drying (namely, the image) described later, the mass content of the water-soluble organic solvent in the ink in the pre-irradiation sample is quantified using a gas chromatograph (GC) and the mass content of water in the ink in the pre-irradiation sample is quantified by the Karl Fischer titration method.

The mass content of the water-soluble organic solvent and the mass content of water determined above are added together and the resultant value is defined as the content of the liquid component in the ink before irradiation with the actinic energy ray.

For the content of the liquid component in the ink after irradiation with the actinic energy ray, the following is performed.

A sample obtained by performing, in the actual ink jet recording method, the ink preparation step to the irradiation step is used as a measurement sample for the content of the liquid component in the ink after irradiation with the actinic energy ray (hereafter, also referred to as the post-irradiation sample). Note that, as in the preparation of the pre-irradiation sample, the image formed in the application step is a solid image having the shape of a 4 cm×4 cm square, irradiation with an actinic energy ray is not performed except for the irradiation step, and, even when heating is performed during application of the ink in the actual ink jet recording method, the substrate is not heated during application of the ink in the preparation of the measurement sample.

The content of the liquid component in the ink after irradiation with the actinic energy ray is determined by the same method as in the content of the liquid component in the ink before heat-drying (namely, the image) described later except that, instead of the image recorded product 1 described later, the post-irradiation sample is used.

Specifically, by the same method as in the content of the liquid component in the ink before heat-drying (namely, the image) described later, the mass content of the water-soluble organic solvent in the ink in the post-irradiation sample is quantified using a gas chromatograph (GC), and the mass content of water in the ink in the post-irradiation sample is quantified by the Karl Fischer titration method.

The mass content of the water-soluble organic solvent and the mass content of water determined above are added together and the resultant value is defined as the content of the liquid component in the ink after irradiation with the actinic energy ray.

In EXAMPLES described later, the substrate was changed to an OPP (oriented polypropylene) substrate to prepare the pre-irradiation sample and the post-irradiation sample, and the prepared pre-irradiation sample and post-irradiation sample and an OPP substrate serving as a blank were used to measure the residual liquid-component content in the irradiation step.

Drying Step

The recording method according to the present disclosure preferably further includes a drying step of heat-drying the ink having been irradiated with the actinic energy ray (namely, the image).

This further improves the wear resistance of the image and further suppresses the stickiness of the image.

The heating means for heating the ink is not particularly limited; examples include a heat drum, hot air, an infrared lamp, an infrared LED, an infrared heater, a heating oven, a hot plate, an infrared laser, and an infrared dryer.

In the heat-drying, the heating temperature is preferably 40° C. or more, more preferably 40° C. to 200° C., still more preferably 40° C. to 100° C., yet more preferably 40° C. to 80° C., still yet more preferably 45° C. to 70° C.

The heating temperature refers to the temperature of the ink on the substrate, and can be measured with a thermograph using an infrared thermography apparatus H2640 (manufactured by Nippon Avionics Co., Ltd.).

The heating time can be appropriately set in accordance with, for example, the heating temperature, the composition of the ink, and the printing speed. The heating time is preferably 5 seconds or more, more preferably 5 seconds to 20 minutes, still more preferably 10 seconds to 10 minutes, yet more preferably 20 seconds to 5 minutes.

Content of Liquid Component in Ink after Heat-Drying

In the drying step, the content of the liquid component in the ink after heat-drying relative to the content of the liquid component in the ink before heat-drying (hereafter, also referred to as "residual liquid-component content in the drying step") is preferably 50 mass % or less, more preferably 2.0 mass % to 50 mass %, still more preferably 2.0 mass % to 40 mass %.

When the residual liquid-component content in the drying step is 50 mass % or less, the image quality and wear resistance of the image are further improved.

When the residual liquid-component content in the drying step is 2.0 mass % or more, the adhesiveness of the image to the substrate is further improved.

The residual liquid-component content in the drying step can be controlled by adjusting heating conditions in the drying step (for example, the heating temperature and the heating time).

The liquid component used herein means water and a water-soluble organic solvent.

The content of the liquid component in the ink before heat-drying means the mass content of the liquid component in the ink before heat-drying (specifically, the total mass content of water and the water-soluble organic solvent), and the content of the liquid component in the ink after heat-drying means the mass content of the liquid component in the ink after heat-drying (specifically, the total mass content of water and the water-soluble organic solvent).

The ink before heat-drying and the ink after heat-drying are both inks having been irradiated with the actinic energy ray and hence both correspond to "images" according to the present disclosure. Thus, in the present disclosure, the ink before heat-drying and the ink after heat-drying may also be respectively referred to as the image before heat-drying and the image after heat-drying.

The residual liquid-component content in the drying step (specifically, the content of the liquid component in the ink after heat-drying (mass %) relative to the content of the liquid component in the ink before heat-drying) is determined by determining individually the content of the liquid component in the ink before heat-drying and the content of the liquid component in the ink after heat-drying in the following manner and by, on the basis of the resultant values, determining the residual liquid-component content.

The content (namely, mass content) of the liquid component in the ink before heat-drying (namely, the image) is measured, using a substrate having an image after exposure and before heat-drying (hereafter, also referred to as "image recorded product 1"), in the following manner.

First, in the image recorded product 1, the water-soluble organic solvent in the image is extracted using a mixed solution of methanol/tetrahydrofuran (THF)=1/1 (volume ratio) under conditions of 25° C. and 24 hours. The resultant extract is treated using a gas chromatograph (GC) to quantify the mass content of the extracted water-soluble organic solvent.

Subsequently, in the image recorded product 1, the mass content of water in the image is quantified by the Karl Fischer titration method.

The mass content of the water-soluble organic solvent and the mass content of water determined above are added together and the resultant value is defined as the mass content of the liquid component in the ink before heat-drying (namely, the image).

An example of the method of measuring the content of the water-soluble organic solvent using the image recorded product 1 will be described below. This example is an example in which the water-soluble organic solvent is propylene glycol (PG).

From the image recorded product 1, three specimens having the shape of a 15 mm×8 mm rectangle are sampled.

A mixed solution of methanol/tetrahydrofuran (THF)=1/1 (volume ratio) is prepared and defined as a solvent A.

Each of the specimens is subjected to an extraction procedure of immersion of 1 mL of the solution A for 24 hours. The extract from the extraction procedure is syringe-filtered and subsequently diluted 10-fold. The resultant diluted solution was treated using a gas chromatograph (GC) under the following GC conditions to quantify the mass content of the water-soluble organic solvent.

GC Conditions
  GC apparatus: Agilent 7890A (manufactured by Agilent Technologies)
  Column=DB-WAX (60 m) (manufactured by Agilent Technologies)
  Amount of injection=1 μL
  Temperature in vaporization chamber=240° C.
  Gradient=120° C. (5 min)→240° C./15 min (heating rate=8° C./min)→cooling to 120° C. (cooling rate=30° C./min)

An example of the method of measuring the water content using the image recorded product 1 will be described below.

From the image recorded product 1, three specimens having the shape of a 24 mm×30 mm rectangle are sampled.

Each of the specimens is treated using a trace moisture meter CA-200 and a heating vaporization unit (VA-230) manufactured by Mitsubishi Chemical Analytech Co., Ltd. by the Karl Fischer titration method to measure the water content (based on mass) of the specimen. As the anolyte, AQUAMICRON AKX is employed and, as the catholyte, AQUAMICRON CxU is employed. As the mass of the blank, the mass of a substrate having the same volume as the substrate of each of the specimens is measured.

The content of the liquid component in the ink after heat-drying (namely, the image) is also determined by the same method as in the content of the liquid component in the ink before heat-drying (namely, the image).

On the basis of the content of the liquid component in the ink after heat-drying (namely, the image) and the content of the liquid component in the ink before heat-drying (namely, the image), the residual liquid-component content in the drying step (specifically, the content (mass %) of the liquid component in the ink after heat-drying relative to the content of the liquid component in the ink before heat-drying) is determined.

In EXAMPLES described later, the substrate is changed to an OPP (oriented polypropylene) substrate to produce an image recorded product, and the produced image recorded product and an OPP substrate serving as a blank were used to measure the residual liquid-component content in the drying step.

Hereinafter, preferred examples of the ink used for the recording method according to the present disclosure will be described.

Ink

The ink in the recording method according to the present disclosure (hereafter, also referred to as the ink according to the present disclosure) contains water and particles including a polymer P and a polymerizable monomer M (hereafter, also referred to as "specified particles"), wherein the polymerizable monomer M includes a monomer (M-1) having a viscosity at 25° C. of 500 mPa·s or less, and the content of the monomer (M-1) relative to the total solid content of the specified particles is 25 mass % to 80 mass %.

Hereinafter, components that can be contained in the ink will be described.

Specified Particles

The ink contains at least one species of specified particles (specifically, particles including the polymer P and the polymerizable monomer M).

In the ink according to the present disclosure, the feature in which the polymer P and the polymerizable monomer M are included in the specified particles contributes to the ejection performance of the ink from an ink jet head (hereafter, also simply referred to as "ink ejection performance").

The ink according to the present disclosure preferably has the following form: in the ink to be applied onto the substrate, the polymerizable monomer M remains in the specified particles and, in the ink having been applied onto the substrate, the polymerizable monomer M seeps out from the specified particles.

Polymerizable Monomer M

The specified particles include at least one species of the polymerizable monomer M.

The polymerizable monomer M, during curing of the ink having been applied onto the substrate, bond together the specified particles to contribute to improvement in the wear resistance and image quality of the image.

The specified particles may include a single species of the polymerizable monomer M alone or two or more species of the polymerizable monomer M.

As the polymerizable monomer M included in the specified particles, the compounds described in Paragraphs 0097 to 0105 in WO2016/052053A may be used.

The polymerizable monomer M has a molecular weight of preferably 100 to 4000, still more preferably 100 to 2000, yet more preferably 100 to 1000, still yet more preferably 100 to 900, even yet more preferably 100 to 800, particularly preferably 150 to 750.

The polymerizable monomer M that can be included in the specified particles is more preferably a radical-polymerizable monomer.

The radical-polymerizable monomer has a radical-polymerizable group in the molecular structure.

Preferred examples of the radical-polymerizable group of the radical-polymerizable monomer are the same as the above-described preferred examples of the radical-polymerizable group that the polymer P can include.

Examples of the radical-polymerizable monomer include acrylate compounds, methacrylate compounds, styrene compounds, vinylnaphthalene compounds, N-vinyl heterocyclic compounds, unsaturated polyesters, unsaturated polyethers, unsaturated polyamides, and unsaturated urethanes.

The radical-polymerizable monomer is preferably a compound having an ethylenically unsaturated group.

When the specified particles includes the radical-polymerizable monomer, the specified particles may include a single species of a radical-polymerizable monomer alone, or may include two or more species of radical-polymerizable monomers.

Examples of the acrylate compounds include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isostearyl acrylate, 2-ethylhexyl diglycol acrylate, 2-hydroxybutyl acrylate, 2-acryloyloxyethyl hydrophthalate, ethoxydiethylene glycol acrylate, methoxydiethylene glycol acrylate, methoxypolyethylene glycol acrylate, methoxypropylene glycol acrylate, 2-hydroxy-3-phenoxypropyl acrylate, vinyl ether acrylate, 2-acryloyloxyethyl succinate, 2-acryloyloxy phthalate, 2-acryloxyethyl-2-hydroxyethyl phthalate, lactone-modified acrylate, acryloylmorpholine, acrylamide, and substituted acrylamides (for example, N-methylolacrylamide and diacetoneacrylamide);

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxyneopentyl glycol diacrylate, propoxylated neopentyl glycol diacrylate, alkoxylated dimethyloltricyclodecane diacrylate, polytetramethylene glycol diacrylate, alkoxylated cyclohexanonedimethanol diacrylate, alkoxylated hexanediol diacrylate, dioxane glycol diacrylate, cyclohexanonedimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanurate triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerol propoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compounds include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate; and bifunctional methacrylate compounds such as polyethylene glycol dimethacrylate, polypropylene glycol dimethacrylate, 2,2-bis(4-methacryloxypolyethoxyphenyl)propane, and tetraethylene glycol dimethacrylate.

Examples of the styrene compounds include styrene, p-methylstyrene, p-methoxystyrene, β-methylstyrene, p-methyl-β-methylstyrene, α-methylstyrene, and p-methoxy-β-methylstyrene.

Examples of the vinylnaphthalene compounds include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinylheterocyclic compounds include N-vinylcarbazole, N-vinylpyrrolidone, N-vinylethylacetamide, N-vinylpyrrole, N-vinylphenothiazine, N-vinylacetanilide, N-vinylethylacetamide, N-vinylsuccinimide, N-vinylphthalimide, N-vinylcaprolactam, and N-vinylimidazole.

Other examples of the radical-polymerizable monomer include allyl glycidyl ether, diallyl phthalate, triallyl trimellitate, and N-vinylamides such as N-vinylformamide.

Of these radical-polymerizable monomers, a preferred bi- or lower functional radical-polymerizable monomer is at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanonedimethanol diacrylate, alkoxylated hexanediol diacrylate, polyethylene glycol diacrylate, and polypropylene glycol diacrylate.

A preferred tri- or higher functional radical-polymerizable monomer is at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritolethoxy tetraacrylate, glycerol propoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The specified particles may include a combination of a bi- or lower functional radical-polymerizable monomer and a tri- or higher functional radical-polymerizable monomer. In this case, the bi- or lower functional radical-polymerizable monomer mainly further improves the adhesiveness between the film and the substrate, and the tri- or higher functional radical-polymerizable monomer mainly further improves the hardness of the film.

Examples of the combination of a bi- or lower functional radical-polymerizable monomer and a tri- or higher functional radical-polymerizable monomer include a combination of a bifunctional acrylate compound and a trifunctional acrylate compound, a combination of a bifunctional acrylate compound and a pentafunctional acrylate compound, and a combination of a monofunctional acrylate compound and a tetrafunctional acrylate compound.

From the viewpoint of further improving the adhesiveness between the film and the substrate, at least one species of a radical-polymerizable monomer that can be included in the specified particles is preferably a radical-polymerizable monomer having a ring structure (hereafter, also referred to as "cyclic radical-polymerizable monomer").

Examples of the cyclic radical-polymerizable monomer include cyclohexyl acrylate, tetrahydrofurfuryl acrylate, benzyl acrylate, isobornyl acrylate, dicyclopentenyl acrylate, dicyclopentenyloxyethyl acrylate, dicyclopentanyl acrylate, ethoxylated isocyanurate triacrylate, and ε-caprolactone-modified tris-(2-acryloxyethyl) isocyanurate.

Other examples include bi- or higher functional cyclic radical-polymerizable monomers described below.

From the viewpoint of further improving the adhesiveness between the film and the substrate, at least one species of the radical-polymerizable monomer that can be included in the specified particles is preferably a polymerizable monomer including, in a single molecule, one or more ring structures and two or more (meth)acryloyl groups (hereafter, also referred to as "bi- or higher functional cyclic radical-polymerizable monomer").

Examples of the bi- or higher functional cyclic radical-polymerizable monomer include tricyclodecanedimethanol di(meth)acrylate,
bisphenol A ethylene oxide (EO) adduct di(meth)acrylate,
bisphenol A propylene oxide (PO) adduct di(meth)acrylate,
ethoxylated bisphenol A di(meth)acrylate,
alkoxylated dimethyloltricyclodecane di(meth)acrylate,
alkoxylated cyclohexanonedimethanol di(meth)acrylate, and
cyclohexanonedimethanol di(meth)acrylate.

When the specified particles include a radical-polymerizable monomer, the content of the bi- or higher functional cyclic radical-polymerizable monomer relative to the total amount of the radical-polymerizable monomer is preferably 10 mass % to 100 mass %, more preferably 30 mass % to 100 mass %, particularly preferably 40 mass % to 100 mass %.

In addition to the above-described radical-polymerizable monomers, there are other usable radical-polymerizable monomers such as commercially available products described in, for example, "Crosslinking Agent Handbook", edited by Shinzo YAMASHITA (1981, TAISEISHA LTD.); "UV/EB Curing Handbook (Raw Material)", edited by Kiyomi KATO (1985, Kobunshi Kankokai); "Applications and Markets of UV/EB Curing Techniques", edited by RadTech Japan, p. 79 (1989, CMC Publishing Co., Ltd.); and "Polyester Resin Handbook", written by Eiichiro TAKIYAMA (1988, THE NIKKAN KOGYO SHIMBUN, LTD.); and radical-polymerizable and crosslinkable monomers publicly known in the industry.

The content of the polymerizable monomer M (specifically, all the polymerizable monomers in the specified particles) relative to the total solid content of the specified particles is not particularly limited as long as the condition that the monomer (M-1) content relative to the total solid content of the specified particles is 25 mass % to 80 mass % is satisfied.

The polymerizable monomer M content relative to the total solid content of the specified particles is 25 mass % to 90 mass %, more preferably 25 mass % to 80 mass %, still more preferably 25 mass % to 75 mass %, yet more preferably 25 mass % to 70 mass %.

The polymerizable monomer M content relative to the total ink amount is preferably 0.3 mass % to 20 mass %, more preferably 0.5 mass % to 15 mass %, still more preferably 1 mass % to 10 mass %.

The polymerizable monomer M includes the monomer (M-1) having a viscosity at 25° C. (hereafter, also simply referred to as "viscosity") of 500 mPa·s or less.

The monomer (M-1) is a relatively-low-viscosity polymerizable monomer having the above-described viscosity, and is a polymerizable monomer that is likely to seep out from the specified particles.

The viscosity of the monomer (M-1) is a value measured using a viscometer.

As the viscometer, for example, a VISCOMETER TV-22 (Toki Sangyo Co., Ltd.) can be employed.

The monomer (M-1) is a polymerizable monomer having a viscosity at 25° C. of 500 mPa·s or less.

The lower limit of the viscosity of the monomer (M-1) is not particularly limited; the lower limit is, for example, 10 mPa·s.

As the monomer (M-1), of the radical-polymerizable monomers described above as examples, monomers of 500 mPa·s or less can be appropriately selected and employed.

Examples of the monomer (M-1) include
pentaerythritol tetraacrylate,
tricyclodecanedimethanol diacrylate,
glycerol propoxy triacrylate,
1,12-dodecanediol dimethacrylate,
dicyclopentenyloxyethyl methacrylate,
2-phenoxyethyl acrylate,
dicyclopentanyl acrylate,
1,6-hexanediol diacrylate,
1,9-nonanediol diacrylate, and
1,10-decanediol diacrylate.

The content of the monomer (M-1) relative to the total solid content of the specified particles is 25 mass % to 80 mass %.

When the monomer (M-1) content relative to the total solid content of the specified particles is 25 mass % or more, the image quality and wear resistance of the image are improved.

Specifically, when the monomer (M-1) content relative to the total solid content of the specified particles is 25 mass % or more, in the ink having been applied onto the substrate, before exposure, the polymerizable monomer M (in particular, the monomer (M-1)) becomes more likely to seep out from the specified particles. The ink including the polymerizable monomer M (in particular, the monomer (M-1)) having seeped out is exposed, so that curing between specified particles (bonding between specified particles) proceeds. As a result, the strength of the film as a whole is increased to improve the wear resistance of the image, and thickening of the ink is promoted to improve the image quality of the image.

On the other hand, when the monomer (M-1) content relative to the total solid content of the specified particles is 80 mass % or less, the polymer P content in the specified particles is ensured, which results in improvement in the ink ejection performance.

From the viewpoint of further improving the ink ejection performance, the monomer (M-1) content relative to the total solid content of the specified particles is preferably 75 mass % or less, more preferably 70 mass % or less.

The polymerizable monomer M, as long as it satisfies the condition of "the monomer (M-1) content relative to the total solid content of the specified particles is 25 mass % to 80 mass %", may include a polymerizable monomer other than the monomer (M-1) (hereafter, also referred to as "monomer (M-2)").

From the viewpoint of further improving the image quality and wear resistance of the image, the content of the monomer (M-1) relative to the total amount of the polymerizable monomer M included in the specified particles is preferably 50 mass % to 100 mass %, more preferably 60 mass % to 100 mass %, still more preferably 80 mass % to 100 mass %.

When the polymerizable monomer M includes the monomer (M-1), the monomer (M-1) content relative to the total ink amount is preferably 0.3 mass % to 20 mass %, more preferably 0.5 mass % to 15 mass %, still more preferably 1 mass % to 10 mass %.

The monomer (M-1) preferably includes a monomer (M1A) having a viscosity at 25° C. of 150 mPa·s or less.

The monomer (M1A) is, of the monomer (M-1), a polymerizable monomer that is more likely to seep out from the specified particles.

Thus, when the monomer (M-1) includes the monomer (M1A), the image quality and wear resistance of the image are further improved.

The monomer (M1A) is a polymerizable monomer having a viscosity at 25° C. of 150 mPa·s or less.

The lower limit of the viscosity of the monomer (M1A) is not particularly limited; the lower limit is, for example, 10 mPa·s.

As the monomer (M1A), of the radical-polymerizable monomers described above as examples, monomers having 150 mPa·s or less can be appropriately selected and employed.

Examples of the monomer (M1A) include
tricyclodecanedimethanol diacrylate,
glycerol propoxy triacrylate,
1,12-dodecanediol dimethacrylate,
dicyclopentenyloxyethyl methacrylate,
2-phenoxyethyl acrylate,
dicyclopentanyl acrylate,
1,6-hexanediol diacrylate,
1,9-nonanediol diacrylate, and
1,10-decanediol diacrylate.

The monomer (M-1) may include a polymerizable monomer other than the monomer (M1A) (hereafter, also referred to as "monomer (M2A)").

From the viewpoint of further improving the image quality and wear resistance of the image, the content of the monomer (M1A) relative to the total amount of the monomer (M-1) is preferably 50 mass % to 100 mass %, more preferably 60 mass % to 100 mass %, still more preferably 80 mass % to 100 mass %.

From the viewpoint of further improving the image quality and wear resistance of the image, the content of the monomer (M1A) relative to the total amount of the polymerizable monomer M included in the specified particles is preferably 50 mass % to 100 mass %, more preferably 60 mass % to 100 mass %, still more preferably 80 mass % to 100 mass %.

When the polymerizable monomer M includes the monomer (M1A), the monomer (M1A) content relative to the total ink amount is preferably 0.3 mass % to 20 mass %, more preferably 0.5 mass % to 15 mass %, still more preferably 1 mass % to 10 mass %.

Other examples of the radical-polymerizable monomer serving as the polymerizable monomer M include the radical-polymerizable monomers described in patent publications such as JP1995-159983A (JP-H7-159983A), JP1995-31399B (JP-H7-31399B), JP1996-224982A (JP-H8-224982A), JP1998-863A (JP-H10-863A), JP1997-134011A (JP-H9-134011A), and JP2004-514014A.

Examples of the commercially available product of the radical-polymerizable monomer include AH-600 (bifunctional), AT-600 (bifunctional), UA-306H (hexafunctional), UA-306T (hexafunctional), UA-306I (hexafunctional), UA-510H (decafunctional), UF-8001G (bifunctional), DAUA-167 (bifunctional), LIGHT ACRYLATE NPA (bifunctional), LIGHT ACRYLATE 3EG-A (bifunctional) (all are from Kyoeisha Chemical Co., Ltd.), SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), SR399E (pentafunctional) (all are from Sartomer), A-NOD-N(NDDA, bifunctional), A-DOD-N (DDDA, bifunctional), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), AD-TMP (tetrafunctional) (all are from Shin Nakamura Chemical Co., Ltd.), UV-7510B (trifunctional) (The Nippon Synthetic Chemical Industry Co., Ltd.), KAYARAD DPCA-30 (hexafunctional), and KAYARAD DPEA-12 (hexafunctional) (all are from Nippon Kayaku Co., Ltd.).

Other preferred examples of the radical-polymerizable monomer include commercially available products such as NPGPODA (neopentyl glycol propylene oxide adduct diacrylate), SR531, SR285, SR256 (all are from Sartomer), A-DHP (dipentaerythritol hexaacrylate, Shin Nakamura Chemical Co., Ltd.), ARONIX (registered trademark) M-156 (TOAGOSEI CO., LTD.), V-CAP (BASF), and VISCOAT #192 (OSAKA ORGANIC CHEMICAL INDUSTRY LTD.).

Polymer P

The specified particles include at least one species of the polymer P.

The polymer P, in the ink to be ejected from an ink jet head, has the role of keeping the polymerizable monomer M within the specified particles, to thereby contribute to improvement in the ink ejection performance.

The polymer P may be a chain polymer or may be a crosslinked polymer.

In the present disclosure, the chain polymer means a polymer not having a crosslinked structure, and the crosslinked polymer means a polymer having a crosslinked structure.

The chain polymer may have a ring structure or may have a branched structure.

For the specified particles including the polymer P being a chain polymer, for example, reference can be made to JP6584677B.

When the polymer P is a crosslinked polymer, a preferred example of the specified particles is microcapsules including a shell formed of the polymer P being a crosslinked polymer and a core including a polymerizable monomer.

For the specified particles including the polymer P being a crosslinked polymer, for example, reference can be made to JP6510681B.

Weight-Average Molecular Weight (Mw)

The polymer P has a weight-average molecular weight (Mw) of, from the viewpoint of further improving the ink ejection performance, preferably 3000 to 200000, more preferably 4000 to 150000, still more preferably 5000 to 100000, yet more preferably 8000 to 80000, still yet more preferably 10000 to 50000.

When the polymer P has a Mw of 3000 or more, the wear resistance of the image is further improved.

When the polymer P has a Mw of 200000 or less, the ink ejection performance is further improved.

In the present disclosure, the number-average molecular weight (Mn) and the weight-average molecular weight (Mw) mean polystyrene-equivalent values calculated by gel permeation chromatography (GPC).

As the columns employed, for example, TSKgel (registered trademark) SuperHZM-H, TSKgel (registered trademark) SuperHZ4000, and TSKgel (registered trademark) SuperHZ200 (all are manufactured by Tosoh Corporation) are employed.

Glass Transition Temperature (Tg)

The polymer P is not particularly limited in terms of glass transition temperature (Tg).

From the viewpoint of improving the mobility of the polymer P and further improving the image quality of the image (specifically, suppressing the granularity of the image), the polymer P has a Tg of preferably 120° C. or less, more preferably 100° C. or less, still more preferably 80° C. or less, yet more preferably 70° C. or less.

On the other hand, the polymer P has a Tg of preferably 0° C. or more, more preferably 10° C. or more, still more preferably 20° C. or more, yet more preferably 30° C. or more.

In the present disclosure, the glass transition temperature (Tg) of the polymer means a value measured by differential scanning calorimetry (DSC).

Specifically, the glass transition temperature is measured in accordance with a method described in JIS K 7121 (1987) or JIS K 6240 (2011).

In the present disclosure, the glass transition temperature is the extrapolated glass transition onset temperature (hereafter, also referred to as Tig).

More specifically, the method of measuring the glass transition temperature will be described.

In the case of determining the glass transition temperature, the apparatus is held at a temperature about 50° C. lower than the estimated glass transition temperature of the resin until it becomes stable; subsequently, heating is performed at a heating rate of 20° C./min to a temperature about 30° C. higher than the glass transition end temperature, and a differential thermal analysis (DTA) curve or a DSC curve is created.

The extrapolated glass transition onset temperature (Tig), which is the glass transition temperature in the present disclosure, is determined as the temperature at the point of intersection between a straight line extended from the baseline from the lower-temperature side to the higher-temperature side in the DTA curve or the DSC curve, and a tangent drawn at the maximum gradient of the curve in the stepped change region of glass transition.

When the ink includes two or more polymers P, the glass transition temperature (Tg) of the polymer P means the weighted mean value of the glass transition temperatures of the polymers P.

Examples of the polymer P include urethane polymers, urethane-urea polymers, urea polymers, acrylic polymers, polyesters, polyolefins, polystyrenes, polycarbonates, and polyamides.

The urethane polymers mean polymers including a urethane bond and not including a urea bond; the urea polymers mean polymers including a urea bond and not including a urethane bond; the urethane-urea polymers mean polymers including a urethane bond and a urea bond.

The acrylic polymers mean polymers (homopolymers or copolymers) of a raw material monomer including at least one selected from the group consisting of acrylic acid, acrylic acid derivatives (for example, acrylates), methacrylic acid, and methacrylic acid derivatives (for example, methacrylates).

Bond U

The polymer P preferably includes a bond U, which is at least one of a urethane bond or a urea bond. Stated another way, the polymer P is preferably a urethane polymer, a urethane-urea polymer, or a urea polymer.

When the polymer P includes the bond U, in the ink having landed to the substrate, the interaction between bonds U (for example, hydrogen bonds) tend to cause the interaction between specified particles. Thus, the polymerizable monomer M (specifically the monomer (M-1)) having seeped out from the specified particles polymerizes, which facilitates bonding between specified particles. This facilitates curing between specified particles, so that the wear resistance of the image is further improved.

The bond U preferably includes a urethane bond.

Stated another way, the polymer P preferably includes a urethane bond but does not include a urea bond, or preferably includes a urethane bond and a urea bond.

Hydrophilic Group

The polymer P preferably includes at least one species of a hydrophilic group.

This contributes to the dispersion stability of the specified particles in the ink, which results in further improvement in the ink preservation stability.

From the viewpoint of further improving the ink preservation stability, the hydrophilic group is preferably an anionic group or a nonionic group, more preferably an anionic group.

For example, of an anionic group and a nonionic group that have the same molecular weight, the anionic group provides a stronger effect of improving the ink preservation stability. Thus, the anionic group (particularly preferably at least one species selected from the group consisting of a carboxy group and salts of a carboxy group) can, even in the case of having a low molecular weight, provide sufficiently the effect of improving the ink preservation stability.

The nonionic group may be a group having a polyether structure, and is preferably a monovalent group including a polyalkyleneoxy group.

The anionic group may be neutralized or may not be neutralized.

Examples of the unneutralized anionic group include a carboxy group, a sulfo group, a sulfuric acid group, a phosphonic acid group, and a phosphoric acid group.

The neutralized anionic group means an anionic group in the form of "salt" (for example, a salt of a carboxy group (for example, —COONa)). Examples of the neutralized anionic group include salts of a carboxy group, salts of a sulfo group, salts of a sulfuric acid group, salts of a phosphonic acid group, and salts of a phosphoric acid group.

The neutralization can be performed with, for example, an alkali metal hydroxide (for example, sodium hydroxide or potassium hydroxide) or an organic amine (for example, triethylamine).

The hydrophilic group in the polymer P is, from the viewpoint of further improving the ink preservation stability,
preferably an anionic group,
more preferably at least one species selected from the group consisting of a carboxy group, salts of a carboxy group, a sulfo group, salts of a sulfo group, a sulfuric acid group, salts of a sulfuric acid group, a phosphonic acid group, salts of a phosphonic acid group, a phosphoric acid group, and salts of a phosphoric acid group, still more preferably at least one species selected from the group consisting of a carboxy group, salts of a carboxy group, a sulfo group, and salts of a sulfo group.

In the above-described salts of a carboxy group, salts of a sulfo group, salts of a sulfuric acid group, salts of a phosphonic acid group, and salts of a phosphoric acid group, "salts" are preferably alkali metal salts or organic amine salts, more preferably alkali metal salts.

In the alkali metal salts, the alkali metal is preferably K or Na.

When the polymer P includes, as the hydrophilic group, an anionic group (for example, at least one species selected from the group consisting of a carboxy group and salts of a carboxy group), and the total number of millimoles of the anionic group (for example, a carboxy group or a salt of a carboxy group) included in 1 g of the polymer P is defined as the acid value of the polymer P, the acid value of the polymer P is, from the viewpoint of dispersion stability, preferably 0.10 mmol/g to 2.00 mmol/g, more preferably 0.30 mmol/g to 1.50 mmol/g.

When the polymer P has, as the hydrophilic group, an anionic group, the degree of neutralization of the anionic group in the polymer P is preferably 50% to 100%, more preferably 70% to 90%.

The degree of neutralization used herein refers to, in the polymer P, the ratio of "the number of neutralized anionic groups" to "the total of the number of unneutralized anionic groups (for example, carboxy groups) and the number of neutralized anionic groups (for example, a salt of carboxy groups)" (specifically, ratio [the number of neutralized anionic groups/(the number of unneutralized anionic groups+the number of neutralized anionic groups)]).

The degree of neutralization of anionic groups in the polymer P can be measured by neutralization titration.

Polymerizable Group

The specified particles include, in addition to the polymer P, the above-described polymerizable monomer M (specifically, a compound including a polymerizable group). The polymerizable monomer M contributes to improvement in the wear resistance of the film. Thus, the polymer P does not necessarily include a polymerizable group.

However, from the viewpoint of further improving the wear resistance of the film, the polymer P may include a polymerizable group.

The polymerizable group that can be included in the polymer P is preferably a photopolymerizable group or a thermal-polymerizable group.

The photopolymerizable group is preferably a radical-polymerizable group, more preferably a group including an ethylenically double bond, still more preferably a (meth) acryloyl group, an allyl group, a styryl group, or a vinyl group. The radical-polymerizable group is, from the viewpoint of radical polymerization reactivity and the hardness of a film to be formed, particularly preferably a (meth) acryloyl group.

The thermal-polymerizable group is preferably an epoxy group, an oxetanyl group, an aziridinyl group, an azetidinyl group, a ketone group, an aldehyde group, or a blocked isocyanate group.

The polymer P may contain a single species of a polymerizable group alone, or may contain two or more species of polymerizable groups.

The fact that the polymer P includes such a polymerizable group can be confirmed by, for example, Fourier transform infrared spectroscopy (FT-IR) analysis.

When the number of millimoles of ethylenically double bonds in 1 g of the polymer P is defined as the C=C value of the polymer P, the C=C value of the polymer P is, from the viewpoint of further improving the hardness of the image, preferably 0.05 mmol or more, more preferably 0.10 mmol/g or more, still more preferably 0.30 mmol/g or more, particularly preferably 0.50 mmol/g or more.

The C=C value of the polymer P is, from the viewpoint of further improving the water resistance and alcohol resistance of the image, preferably 0.05 mmol or more, more preferably 0.10 mmol/g or more, still more preferably 0.30 mmol/g or more, yet more preferably 0.50 mmol/g or more, still yet more preferably 0.60 mmol/g or more, particularly preferably 0.70 mmol/g or more.

On the other hand, from the viewpoint of improving the ink temporal curability (specifically, suppressing degradation of the ink curability over time), the C=C value of the polymer P is preferably 4.00 mmol/g or less, more preferably 3.00 mmol/g or less, still more preferably 2.00 mmol/g or less, particularly preferably 1.50 mmol/g or less.

The polymer P may include another structure other than the above-described structures (specifically, the bond U, the hydrophilic group, and the polymerizable group).

Examples of the other structure include polysiloxane bonds (specifically, divalent polysiloxane groups), monovalent polysiloxane groups, monovalent fluorinated hydrocarbon groups, and divalent fluorinated hydrocarbon groups.

Preferred Structure of Polymer P

The polymer P preferably includes a structural unit derived from an isocyanate compound (hereafter, also referred to as "NCO"), and a structural unit derived from a compound including an active hydrogen group.

The polymer P of the preferred example includes a bond U formed by a reaction between an isocyanate group of an isocyanate compound and an active hydrogen group in a compound including an active hydrogen group.

The active hydrogen group is preferably a hydroxy group, a primary amino group, or a secondary amino group.

For example, a reaction between an isocyanate group and a hydroxy group forms a urethane group.

Alternatively, a reaction between an isocyanate group and a primary amino group or a secondary amino group forms a urea group.

Hereafter, the isocyanate compound and the compound including an active hydrogen group that serve as raw materials for the polymer P having the preferred structure may be referred to as raw material compounds.

As such a raw material compound, the isocyanate compound may be a single compound alone or two or more compounds.

As such a raw material compound, the compound including an active hydrogen group may be a single compound alone or two or more compounds.

At least one isocyanate compound serving as a raw material compound is preferably a bi- or higher functional isocyanate compound.

At least one compound including an active hydrogen group and serving as a raw material compound is preferably a compound including two or more active hydrogen groups.

Of the raw material compounds, at least one of the isocyanate compound or the compound including an active hydrogen group preferably includes a hydrophilic group. This facilitates production of the polymer P including a hydrophilic group. In this case, in the finally obtained polymer P, at least some groups of the hydrophilic groups may be provided by neutralization of a hydrophilic group of a raw material compound.

In a more preferred example, of the raw material compounds, at least one compound including an active hydrogen group is a compound including an active hydrogen group and a hydrophilic group.

When the polymer P includes a polymerizable group, of the raw material compounds, at least one of the isocyanate compound or the compound including an active hydrogen group preferably includes a polymerizable group. This facilitates production of the polymer P including a polymerizable group.

In a more preferred example, of the raw material compounds, at least one compound including an active hydrogen group is a compound including an active hydrogen group and a polymerizable group.

As described above, the polymer P may be a chain polymer or may be a crosslinked polymer.

The chain polymer serving as the polymer P can be produced by causing a reaction between a bifunctional isocyanate compound and a compound including two active hydrogen groups.

The crosslinked polymer serving as the polymer P can be produced by causing a reaction between a tri- or higher functional isocyanate compound and a compound including two or more active hydrogen groups.

The crosslinked polymer serving as the polymer P can also be produced by causing a reaction between a bifunctional isocyanate compound and a compound including three or more active hydrogen groups.

Hereinafter, preferred raw material compounds will be described.

Isocyanate Compound

The isocyanate compound is preferably a bi- or higher functional isocyanate compound, more preferably a bifunctional to hexafunctional isocyanate compound.

In the case of using, as a raw material compound, a bifunctional isocyanate compound, the polymer P includes a structural unit derived from the bifunctional isocyanate compound, the following structural unit (P1).

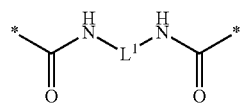

(P1)

In the structural unit (P1), $L^1$ represents a divalent organic group having 1 to 20 carbon atoms, and * represent bonding sites.

Specific examples of $L^1$ include residues provided by removing two isocyanate groups (NCO groups) from the following specific examples of the bifunctional isocyanate compound.

Specific examples of the bifunctional isocyanate compound are as follows. However, the bifunctional isocyanate compound is not limited to the following specific examples.

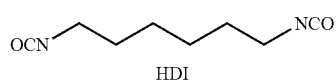

HDI

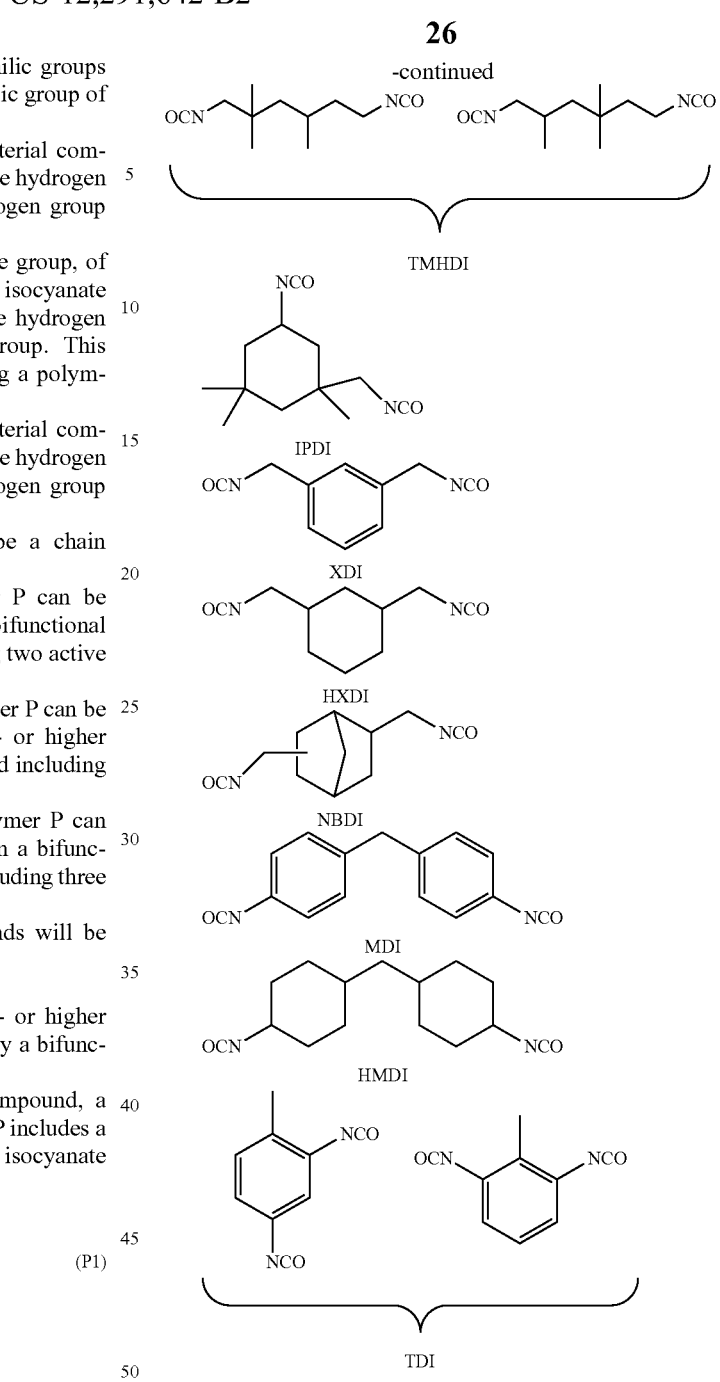

As the bifunctional isocyanate compound, bifunctional isocyanate compounds derived from the above-described specific examples are also usable. Examples include DURANATE (registered trademark) D101, D201, and A101 (manufactured by Asahi Kasei Corporation).

The tri- or higher functional isocyanate compound is preferably a reaction product of at least one selected from the group consisting of bifunctional isocyanate compounds and at least one selected from the group consisting of compounds including three or more active hydrogen groups (for example, tri- or higher functional polyol compounds, tri- or higher functional polyamine compounds, and tri- or higher functional polythiol compounds).

The number of moles (number of molecules) of the bifunctional isocyanate compound caused to react with the compound including three or more active hydrogen groups is preferably 0.6 times or more, more preferably 0.6 times to 5 times, still more preferably 0.6 times to 3 times, yet more preferably 0.8 times to 2 times the number of moles of active hydrogen groups (the number of equivalents of active hydrogen groups) of the compound including three or more active hydrogen groups.

Examples of the bifunctional isocyanate compound for forming the tri- or higher functional isocyanate compound include the bifunctional isocyanate compounds described above as specific examples.

Examples of the compound including three or more active hydrogen groups for forming the tri- or higher functional isocyanate compound include compounds described in Paragraphs 0057 to 0058 in WO2016/052053A.

Examples of the tri- or higher functional isocyanate compound include adduct-type tri- or higher functional isocyanate compounds, isocyanurate-type tri- or higher functional isocyanate compounds, and biuret-type tri- or higher functional isocyanate compounds.

Examples of the commercially available products of the adduct-type tri- or higher functional isocyanate compounds include TAKENATE (registered trademark) D-102, D-103, D-103H, D-103M2, P49-75S, D-110N, D-120N, D-140N, D-160N (all from Mitsui Chemicals, Inc.), DESMODUR (registered trademark) L75, UL57SP (Sumika Bayer Urethane Co., Ltd.), CORONATE (registered trademark) HL, and L (Tosoh Corporation), and P301-75E (Asahi Kasei Corporation).

Examples of the commercially available products of the isocyanurate-type tri- or higher functional isocyanate compounds include TAKENATE (registered trademark) D-127N, D-170N, D-170HN, D-172N, D-177N (all from Mitsui Chemicals, Inc.), SUMIDUR N3300, DESMODUR (registered trademark) N3600, N3900, Z4470BA (all from Sumika Bayer Urethane Co., Ltd.), CORONATE (registered trademark) HX, HK (all from Tosoh Corporation), and DURANATE (registered trademark) TPA-100, TKA-100, TSA-100, TSS-100, TLA-100, and TSE-100 (all from Asahi Kasei Corporation).

Examples of the commercially available products of the biuret-type tri- or higher functional isocyanate compounds include TAKENATE (registered trademark) D-165N, NP1100 (all from Mitsui Chemicals, Inc.), DESMODUR (registered trademark) N3200 (Sumika Bayer Urethane Co., Ltd.), and DURANATE (registered trademark) 24A-100 (Asahi Kasei Corporation).

At least one isocyanate compound serving as a raw material compound may be an isocyanate compound including a hydrophilic group. For the isocyanate compound including a hydrophilic group, reference can be made to Paragraphs 0112 to 0118 and Paragraphs 0252 to 0254 of WO2016/052053A.

At least one isocyanate compound serving as a raw material compound may be an isocyanate compound including a polymerizable group. For the isocyanate compound including a polymerizable group, reference can be made to Paragraphs 0084 to 0089, 0203, and 0205 of WO2016/052053A.

Compound Including Active Hydrogen Group

The compound including an active hydrogen group is preferably a compound including two or more active hydrogen groups.

The compound including two or more active hydrogen groups is more preferably a polyol compound (specifically, a compound having two or more hydroxy groups) or a polyamine compound (specifically, a compound having two or more amino groups).

In the case of using, as a raw material compound, the compound including an active hydrogen group and a hydrophilic group, the polymer P preferably includes at least one species of the following structural unit (P0).

(P0)

In the structural unit (P0), $L^0$ represents a divalent organic group, $Y^1$ and $Y^2$ each independently represent an oxygen atom, a sulfur atom, or a —$NR^1$— group, $R^1$ represents a hydrogen atom or a hydrocarbon group having 1 to 10 carbon atoms, and

* represent bonding sites.

In the structural unit (P0), the divalent organic group represented by $L^0$ may be a group composed of carbon atoms and hydrogen atoms, or may be a group including carbon atoms and hydrogen atoms and further including a heteroatom (for example, an oxygen atom, a nitrogen atom, or a sulfur atom).

The divalent organic group represented by $L^0$ may include at least one of a hydrophilic group or a polymerizable group.

Specific examples of $L^0$ include residues provided by removing two active hydrogen groups from specific examples of the compound including an active hydrogen group described later.

$R^1$ is preferably a hydrogen atom or a hydrocarbon group having 1 to 6 carbon atoms, more preferably a hydrogen atom or a hydrocarbon group having 1 to 3 carbon atoms.

$Y^1$ and $Y^2$ are each independently preferably an oxygen atom or a —$NR^1$— group, more preferably an oxygen atom.

The following are specific examples of diol compounds serving as compounds including an active hydrogen group; however, the compound including an active hydrogen group is not limited to the following specific examples.

(1)

(2)

(3)

(4)

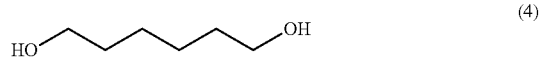

(5)

(6)

(7)

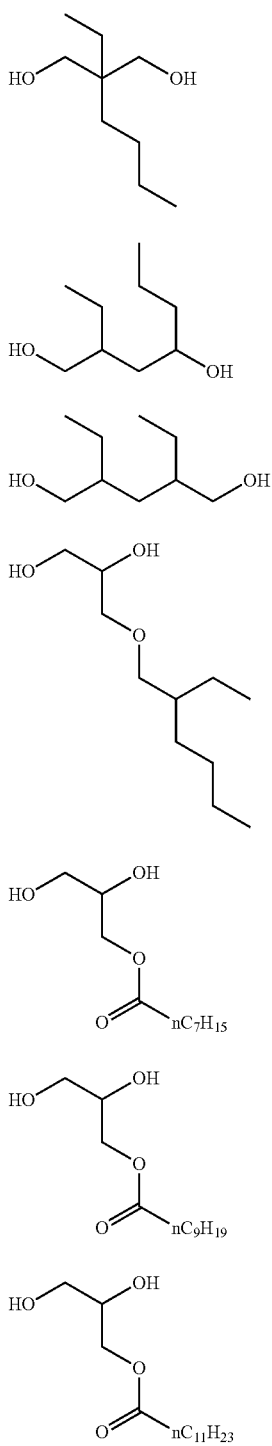
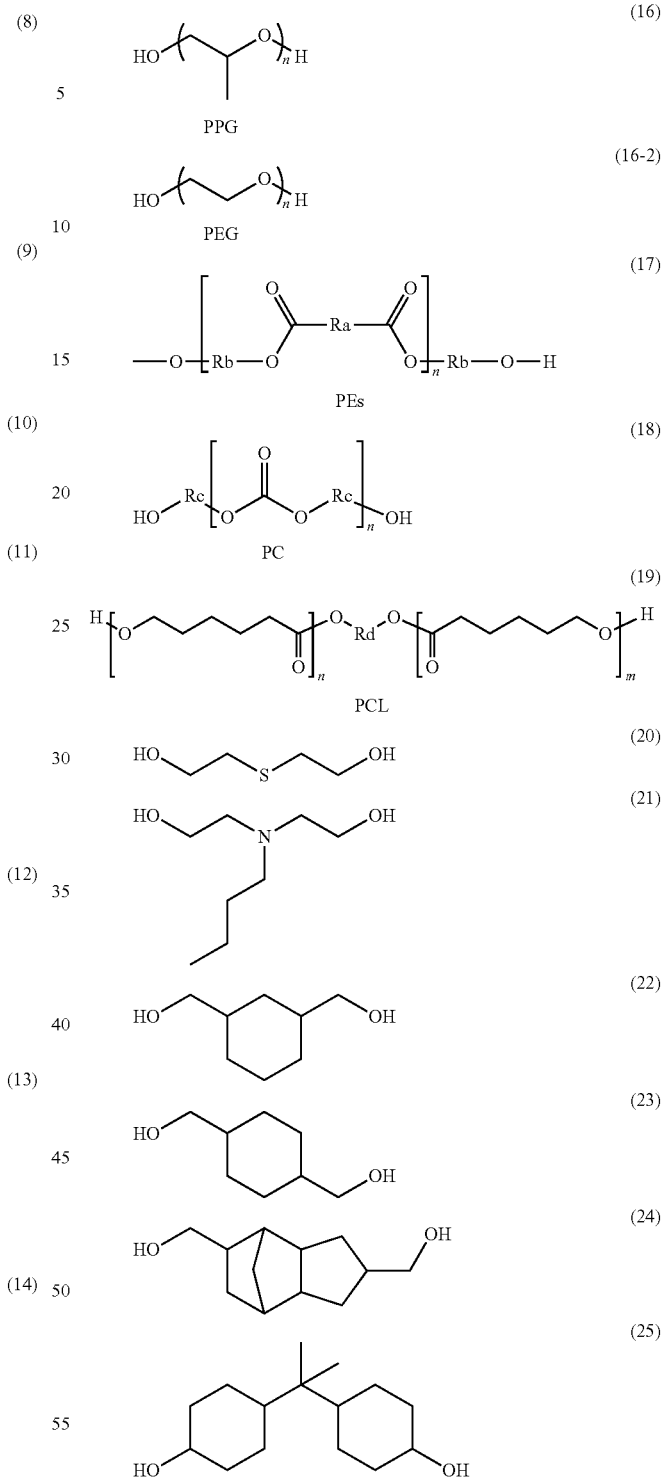
In Compounds (12) to (15), $nC_7H_{15}$, $nC_9H_{19}$, $nC_{11}H_{23}$, and $nC_{17}H_{35}$ respectively represent a normal heptyl group, a normal nonyl group, a normal undecyl group, and a normal heptadecyl group.
Compound (16) PPG is a polypropylene glycol where n is the repeat number.
Compound (16-2) PEG is a polyethylene glycol where n is the repeat number.

Compound (17) PEs is a polyester diol where n is the repeat number, and Ra and two Rb's are each independently a divalent hydrocarbon group having 2 to 25 carbon atoms. In Compound (17) PEs, n Ra's may be the same or different. In Compound (17) PEs, (n+1) Rb's may be the same or different.

Compound (18) PC is a polycarbonatediol where n is the repeat number, and (n+1) Rc's are each independently an alkylene group having 2 to 12 (preferably 3 to 8, more preferably 3 to 6) carbon atoms. In Compound (18) PC, (n+1) Rc's may be the same or different.

Compound (19) PCL is a polycaprolactonediol where n and m are the repeat numbers, and Rd is an alkylene group having 2 to 25 carbon atoms.

Compound Including Active Hydrogen Group and Polymerizable Group

The compound including an active hydrogen group may also be a compound including an active hydrogen group and a polymerizable group.

The compound including an active hydrogen group and a polymerizable group is suitable as a compound for introducing a polymerizable group into the polymer P (hereafter, also referred to as "polymerizable-group-introducing compound").

The following are specific examples of diol compounds serving as compounds including an active hydrogen group and a polymerizable group; however, the compound including an active hydrogen group and a polymerizable group is not limited to the following specific examples.

(26)
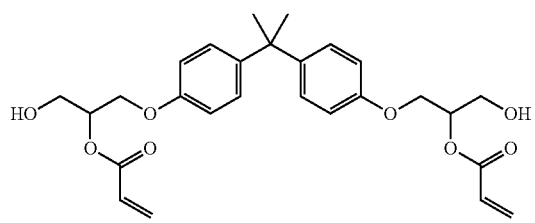

(27)
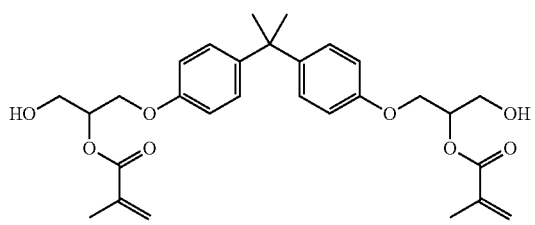

(28)
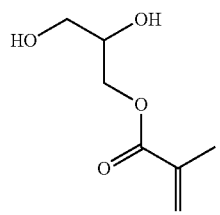

(29)
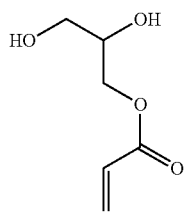

(30)
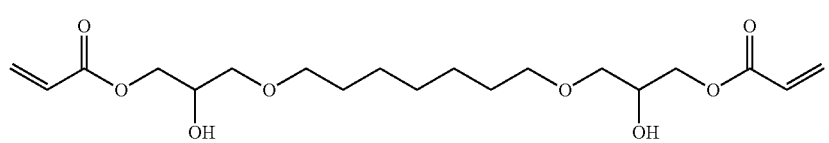

(31)
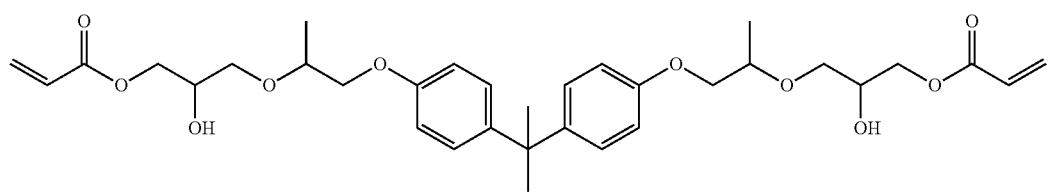

DA-250

(32)
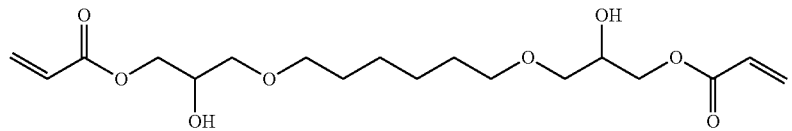

(33)
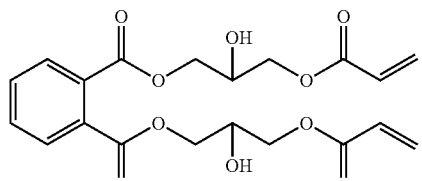

DA-721

(34)
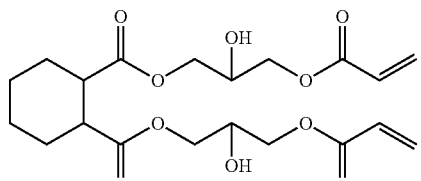

DA-722

-continued

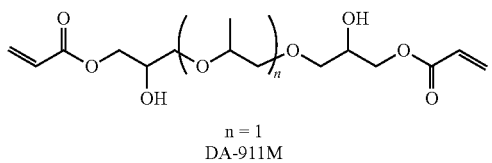

n = 1
DA-911M
(35)

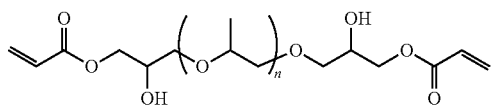

n = 3
DA-920
(36)

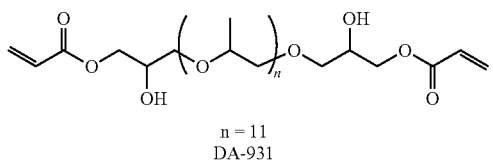

n = 11
DA-931
(37)

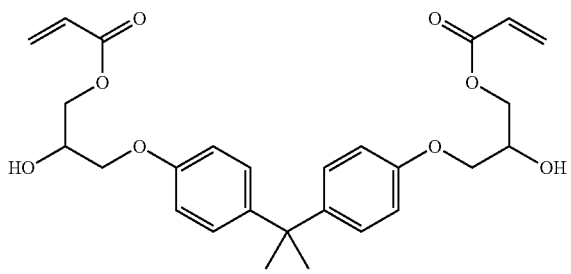

(38)

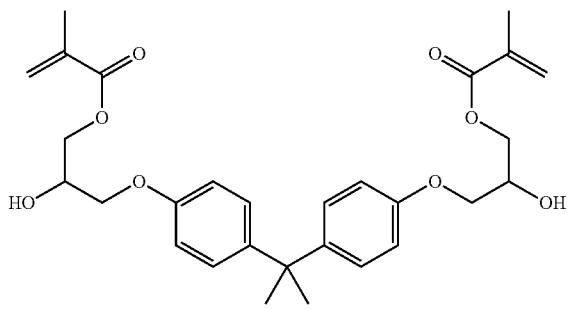

(39)

For the compound including an active hydrogen group and a polymerizable group, reference may be appropriately made to the descriptions of Paragraphs 0075 to 0089 of WO2016/052053A.

Compound Including Active Hydrogen Group and Hydrophilic Group

The compound including an active hydrogen group may also be a compound including an active hydrogen group and a hydrophilic group.

The compound including an active hydrogen group and a hydrophilic group is suitable as a compound for introducing a hydrophilic group into the polymer P (hereafter, also referred to as "hydrophilic-group-introducing compound").

In the case of using, as a raw material compound, the compound including an active hydrogen group and a hydrophilic group, the polymer P preferably includes the following structural unit (P2).

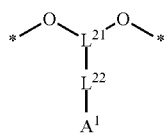

(P2)

In the structural unit (P2),
$L^{21}$ represents a trivalent organic group having 1 to 20 carbon atoms,
$L^{22}$ represents a single bond or a divalent organic group having 1 to 20 carbon atoms, $A^1$ represents a carboxy group, a salt of a carboxy group, a sulfo group, or a salt of a sulfo group, and
* represent bonding sites.

In the trivalent organic group having 1 to 20 carbon atoms represented by $L^{21}$, the number of carbon atoms is preferably 2 to 20, more preferably 3 to 20, still more preferably 4 to 20.

The trivalent organic group represented by $L^{21}$ is preferably a trivalent hydrocarbon group or a group in which at least one carbon atom in a trivalent hydrocarbon group is replaced by a heteroatom (preferably an oxygen atom, a sulfur atom, or a nitrogen atom).

In the divalent organic group having 1 to 20 carbon atoms represented by $L^{22}$, the number of carbon atoms is preferably 1 to 10, more preferably 1 to 6.

The divalent organic group represented by $L^{22}$ is preferably a divalent hydrocarbon group (preferably an alkylene group) or a group in which at least one carbon atom in a divalent hydrocarbon group (preferably an alkylene group) is replaced by an oxygen atom or a sulfur atom (preferably an oxygen atom).

$L^{22}$ may be a single bond.

The following are specific examples of the compound including an active hydrogen group and a hydrophilic group; however, the compound including an active hydrogen group and a hydrophilic group is not limited to the following specific examples. In the following specific examples, the carboxy groups and the sulfo group may be neutralized (specifically, may be salts of carboxy groups and a salt of a sulfo group).

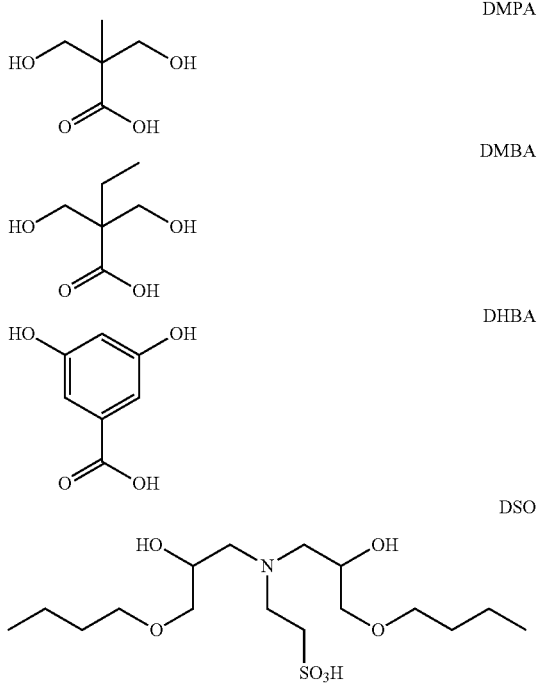

DMPA
DMBA
DHBA
DSO

For the compound including an active hydrogen group and a hydrophilic group, reference can be appropriately made to the descriptions of Paragraphs 0112 to 0118 and Paragraphs 0252 to 0254 of WO2016/052053A.

The polymer P content relative to the total solid content of the specified particles is preferably 10 mass % to 90 mass %, more preferably 20 mass % to 80 mass %, still more preferably 30 mass % to 70 mass %, yet more preferably 40 mass % to 60 mass %.

The polymer P content relative to the total ink amount is preferably 0.3 mass % to 20 mass %, more preferably 0.5 mass % to 15 mass %, still more preferably 1 mass % to 10 mass %.

Radical Polymerization Initiator

The specified particles may include at least one radical polymerization initiator.

In the present disclosure, the radical polymerization initiator means a compound that absorbs light to generate a radical.

When the specified particles include, as the polymerizable monomer, a radical-polymerizable monomer, the specified particles preferably include at least one radical polymerization initiator.

In this case, the formed film has further improved wear resistance and further improved adhesiveness.

The reason for this is inferred that the radical-polymerizable group in the radical-polymerizable monomer and the radical polymerization initiator are positioned close to each other, which results in improvement in the curing sensitivity of the film (hereafter, also simply referred to as "sensitivity").

When the specified particles include a radical polymerization initiator, radical polymerization initiators that have high sensitivity, but have low dispersibility or low solubility in water and hence have been unsuitable (for example, radical polymerization initiators having a degree of solubility in water at 25° C. of 1.0 mass % or less) become usable. This broadens the range of choices of the radical polymerization initiator employed, which also leads to broadening of range of choices of the light source employed. This can provide higher curing sensitivity than before.

Specific examples of the above-described radical polymerization initiators that have high sensitivity, but have low dispersibility or low solubility in water and hence have been unsuitable include carbonyl compounds and acylphosphine oxide compounds described later, and preferred are acylphosphine oxide compounds.

Thus, in the aqueous dispersion and the ink according to the present disclosure, a substance having a low solubility in water can be included in the specified particles, to thereby be contained in the aqueous dispersion and the ink according to the present disclosure, which are aqueous compositions.

Such embodiments of the aqueous dispersion and the ink in which the specified particles include a radical polymerization initiator also have higher preservation stability than existing photocurable compositions. The reason for this is inferred that the radical polymerization initiator is included in the specified particles, so that aggregation or sedimentation of the radical polymerization initiator is suppressed.

For the radical polymerization initiator, for example, reference can be appropriately made to the descriptions of Paragraphs 0091 to 0094 of WO2016/052053A.

The radical polymerization initiator is more preferably (a) a carbonyl compound such as an aromatic ketone or (b) an acylphosphine oxide compound; specific examples include bis(2,4,6-trimethylbenzoyl)-phenylphosphine oxide (for example, IRGACURE (registered trademark) 819 manufactured by BASF), 2-(dimethylamino)-1-(4-morpholinophenyl)-2-benzyl-1-butanone (for example, IRGACURE (registered trademark) 369 manufactured by BASF), 2-methyl-1-(4-methylthiophenyl)-2-morpholinopropan-1-one (for example, IRGACURE (registered trademark) 907 manufactured by BASF), 1-hydroxy-cyclohexyl-phenyl-ketone (for example, IRGACURE (registered trademark) 184 manufactured by BASF), and 2,4,6-trimethylbenzoyl-diphenyl-phosphine oxide (for example, DAROCUR (registered trademark) TPO and LUCIRIN (registered trademark) TPO (both are manufactured by BASF)).

Of these, from the viewpoints of, for example, improving the sensitivity and suitability for LED light, the radical-polymerization initiator is preferably (b) the acylphosphine oxide compound, more preferably a monoacylphosphine oxide compound (particularly preferably 2,4,6-trimethylbenzoyl-diphenyl-phosphine oxide) or a bisacylphosphine oxide compound (particularly preferably bis(2,4,6-trimethylbenzoyl)-phenylphosphine oxide).

The LED light preferably has a wavelength of 355 nm, 365 nm, 385 nm, 395 nm, or 405 nm.

The form of the specified particles including a radical polymerization initiator can be produced by, for example, emulsifying a mixture provided by mixing together an oil-phase component including the polymer P (or the raw material compounds for producing the polymer P), a radical-polymerizable monomer, and a photopolymerization initiator, and an aqueous-phase component.

The content of the radical polymerization initiator relative to the total solid content of the specified particles is preferably 0.1 mass % to 15 mass %, more preferably 0.5 mass % to 10 mass %, still more preferably 1 mass % to 6 mass %.

Sensitizer

The specified particles may include at least one sensitizer.

When the specified particles include at least one photopolymerization initiator, the specified particles preferably include at least one sensitizer.

When the specified particles contain a sensitizer, decomposition of the photopolymerization initiator caused by irradiation with an actinic energy ray can be further promoted.

The sensitizer is a substance that absorbs a specific actinic energy ray to shift to an electroexcitation state. The sensitizer in the electroexcitation state comes into contact with the photopolymerization initiator to cause an effect such as electron transfer, energy transfer, or generation of heat. This promotes a chemical change of the photopolymerization initiator, specifically, for example, decomposition, or generation of a radical, acid, or base.

Examples of the sensitizer include benzophenone, thioxanthone, isopropylthioxanthone, anthraquinone, 3-acylcoumarin derivative, terphenyl, styryl ketone, 3-(aroylmethylene)thiazoline, camphorquinone, eosine, rhodamine, and erythrosine.

Other preferred examples of the sensitizer include the compound represented by General formula (i) in JP2010-24276A and the compound represented by General formula (I) in JP1994-107718A (JP-H6-107718A).

Of the above-described examples, the sensitizer is, from the viewpoints of suitability for LED light and the reactivity to the photopolymerization initiator, preferably at least one selected from the group consisting of thioxanthone, isopropylthioxanthone, and benzophenone, more preferably at least one selected from the group consisting of thioxanthone and isopropylthioxanthone, still more preferably isopropylthioxanthone.

When the specified particles include a sensitizer, such sensitizers may be included alone or in combination of two or more thereof.

When the specified particles include a sensitizer, the content of the sensitizer relative to the solid content of the specified particles is preferably 0.1 mass % to 20 mass %, more preferably 0.2 mass % to 15 mass %, still more preferably 0.3 mass % to 10 mass %.

The specified particles including a photopolymerization initiator and a sensitizer can be produced by, for example, emulsifying a mixture provided by mixing together an oil-phase component including the polymer P (or the raw material compounds for producing the polymer P), a radical-polymerizable monomer, a photopolymerization initiator, and a sensitizer, and an aqueous-phase component.

Other Component

The specified particles may include, in addition to the above-described components, another component.

The other component may be, for example, a compound including at least one selected from the group consisting of polysiloxane bonds (specifically, divalent polysiloxane groups), monovalent polysiloxane groups, monovalent fluorinated hydrocarbon groups, and divalent fluorinated hydrocarbon groups.

Method for Producing Aqueous Dispersion of Specified Particles

The ink according to the present disclosure can be produced by producing an aqueous dispersion of the above-described specified particles containing the specified particles and water and by adding, to the obtained aqueous dispersion, another component as needed.

Alternatively, the ink according to the present disclosure is a form of the aqueous dispersion of the specified particles and hence, depending on the composition of the ink, the ink can be directly produced as an aqueous dispersion of the specified particles (specifically, no other components are added).

The method for producing the aqueous dispersion of the specified particles is not particularly limited.

Examples of the method for producing the aqueous dispersion of the specified particles include the following production method A and production method B.

Production Method A

The production method A has a step of mixing together an oil-phase component including an organic solvent, the polymer P, and a polymerizable monomer and an aqueous-phase component including water and performing emulsification, to thereby obtain the aqueous dispersion of the specified particles.

The production method A is suitable as a method for producing an aqueous dispersion of specified particles including the polymer P that has the form of a chain polymer.

For the production method A, reference can be made to publicly known literature such as JP6584677B.

Production Method B

The production method B has a step of mixing together an oil-phase component including an organic solvent, the raw material compounds of the polymer P (for example, a tri- or higher functional isocyanate compound and a compound having two or more active hydrogen groups), and a polymerizable monomer, and an aqueous-phase component including water and performing emulsification, to thereby obtain an aqueous dispersion of the specified particles.

The production method B is suitable as a method for producing an aqueous dispersion of specified particles (for example, microcapsules) including the polymer P having the form of a crosslinked polymer.

For the production method B, reference can be made to publicly known literature such as WO2016/052053A.

Total Solid Content of Specified Particles in Ink

In the ink, the total solid content of the specified particles relative to the total ink amount is preferably 2 mass % to 30 mass %, more preferably 3 mass % to 25 mass %, still more preferably 4 mass % to 20 mass %, yet more preferably 5 mass % to 15 mass %.

When the total solid content of the specified particles relative to the total amount of the ink according to the present disclosure is 2 mass % or more, the image quality and wear resistance of the image are further improved.

When the total solid content of the specified particles relative to the total amount of the ink according to the present disclosure is 30 mass % or less, the image quality and wear resistance of the image are further improved.

The phase "total solid content of the specified particles in the ink" used herein means the total solid content of the specified particles in the ink to be ejected (specifically, to be ejected from an ink jet head).

Volume-Average Dispersion Particle Size of Specified Particles

In the ink, the volume-average dispersion particle size of the specified particles is not particularly limited, but is, from the viewpoint of dispersion stability, preferably 0.01 µm to 10 µm, more preferably 0.01 µm to 5 µm, still more preferably 0.05 µm to 1 µm, yet more preferably 0.05 µm to 0.5 µm, still yet more preferably 0.05 µm to 0.3 µm.

In the present disclosure, "volume-average dispersion particle size" refers to a value measured by the light scattering method. The volume-average dispersion particle size of the specified particles is measured by the light scattering method using, for example, LA-960 (HORIBA, Ltd.).

Water

The ink according to the present disclosure contains water.

The water content relative to the total amount of the ink according to the present disclosure is preferably 10 mass % or more, more preferably 20 mass % or more, still more preferably 30 mass % or more, particularly preferably 50 mass % or more.

The upper limit of the water content relative to the total amount of the ink according to the present disclosure is appropriately determined in accordance with the contents of other components, but is, for example, 99 mass %, preferably 95 mass %, more preferably 90 mass %.

Water-Soluble Organic Solvent

The ink according to the present disclosure contains at least one water-soluble organic solvent.

In this case, ejection performance of the ink from an ink jet head is ensured.

In the present disclosure, "water-soluble" in "water-soluble organic solvent" means a property of dissolving, in an amount of 1 g or more, in 100 g of water at 25° C.

The amount of the water-soluble organic solvent dissolving in 100 g of water at 25° C. is preferably 5 g or more, more preferably 10 g or more.

The water-soluble organic solvent content relative to the total ink amount is preferably 1 mass % to 50 mass %, more preferably 5 mass % to 30 mass %, still more preferably 8 mass % to 15 mass %, yet more preferably 10 mass % to 20 mass %.

When the water-soluble organic solvent content is 1 mass % or more, the ink ejection performance is further improved.

When the water-soluble organic solvent content is 50 mass % or less, the ink preservation stability is further improved.

Specific examples of the water-soluble organic solvent are as follows.

Alcohols (for example, methanol, ethanol, propanol, isopropanol, butanol, isobutanol, secondary butanol, tertiary butanol, pentanol, hexanol, cyclohexanol, and benzyl alcohol)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, thiodiglycol, and 2-methylpropanediol)

Polyhydric alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether)

Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine)

Amides (for example, formamide, N,N-dimethylformamide, and N,N-dimethylacetamide)

Heterocycles (for example, 2-pyrrolidone, N-methyl-2-pyrrolidone, cyclohexylpyrrolidone, 2-oxazolidone, 1,3-dimethyl-2-imidazolidinone, and γ-butyrolactone)

Sulfoxides (for example, dimethyl sulfoxide)

Sulfones (for example, sulfolane)

Others (urea, acetonitrile, acetone, and the like)

Water-Soluble Organic Solvent (S-1) Having Boiling Point of 190° C. or Less

In the ink according to the present disclosure, the water-soluble organic solvent preferably contains at least one water-soluble organic solvent (S-1) having a boiling point of 190° C. or less (hereafter, also simply referred to as "water-soluble organic solvent (S-1)").

As a result, the blocking resistance of the recorded image is further improved.

In the present disclosure, high blocking resistance means a property of suppressing blocking of an image (specifically, a phenomenon in which, in the case of placing an article on and in contact with the image, the contact article adheres to the image).

In the present disclosure, the boiling point means the boiling point at 1 atm (101325 Pa).

Examples of the water-soluble organic solvent (S-1) include propylene glycol (boiling point: 188° C.), propylene glycol monomethyl ether (boiling point: 121° C.), ethylene glycol monomethyl ether (boiling point: 124° C.), propylene glycol monoethyl ether (boiling point: 133° C.), ethylene glycol monoethyl ether (boiling point: 135° C.), propylene glycol monopropyl ether (boiling point: 149° C.), ethylene glycol monopropyl ether (boiling point: 151° C.), propylene glycol monobutyl ether (boiling point: 170° C.), ethylene glycol monobutyl ether (boiling point: 171° C.), 2-ethyl-1-hexanol (boiling point: 187° C.), dipropylene glycol monomethyl ether (boiling point: 188° C.), diethylene glycol dimethyl ether (boiling point: 162° C.), diethylene glycol diethyl ether (boiling point: 188° C.), and dipropylene glycol dimethyl ether (boiling point: 175° C.).

From the viewpoint of the drying properties of the ink, in the ink according to the present disclosure, the content of the water-soluble organic solvent (S-1) relative to the water-soluble organic solvent is preferably 50 mass % or more, more preferably 60 mass % or more, still more preferably 70 mass % or more.

In the ink according to the present disclosure, the content of the water-soluble organic solvent (S-1) having a boiling point of 190° C. or less relative to the water-soluble organic solvent may be 100 mass %, or may be less than 100 mass %.

When the ink contains the water-soluble organic solvent (S-1), the water-soluble organic solvent (S-1) content relative to the total ink amount is preferably 1 mass % to 35 mass %, more preferably 5 mass % to 30 mass %, still more preferably 8 mass % to 15 mass %, yet more preferably 10 mass % to 20 mass %.

Organic Solvent Having Boiling Point of More than 190° C.

In the ink according to the present disclosure, the water-soluble organic solvent may contain at least one water-soluble organic solvent having a boiling point of more than 190° C.

Examples of the water-soluble organic solvent having a boiling point of more than 190° C. include 2-methyl-1,3-propanediol (MP diol) (boiling point: 214° C.), ethylene glycol (boiling point: 196° C.), 1,2-butanediol (boiling point: 193° C.), glycerol (boiling point: 290° C.), 1,2-hexanediol (boiling point: 223° C.), 1,3-propanediol (boiling point: 213° C.), diethylene glycol (boiling point: 245° C.), diethylene glycol monobutyl ether (boiling point: 230° C.), triethylene glycol (boiling point: 285° C.), dipropylene glycol (boiling point: 232° C.), tripropylene glycol (boiling point: 267° C.), trimethylolpropane (boiling point: 295° C.), 2-pyrrolidone (boiling point: 245° C.), tripropylene glycol monomethyl ether (boiling point: 243° C.), and triethylene glycol monomethyl ether (boiling point: 248° C.).

Coloring Agent

The ink according to the present disclosure may be an ink containing at least one coloring agent (what is called "color ink"), or may be an ink not containing coloring agents (what is called "clear ink").

When the ink contains a coloring material, the coloring material is preferably contained outside of the specified particles (in other words, the specified particles do not include the coloring material).

The coloring material is not particularly limited, and can be freely selected from publicly known coloring materials such as pigments, water-soluble dyes, and disperse dyes and used. Of these, more preferably, pigments are included because of high weather resistance and high color reproducibility.

Such a pigment is not particularly limited, and can be appropriately selected in accordance with the purpose; examples include publicly known organic pigments and inorganic pigments. Other examples of the pigments include resin particles dyed with dyes, and commercially available pigment dispersions and surface-treated pigments (for example, dispersions of pigments in dispersion media such as water, liquid compounds, or insoluble resins, and pigments surface-treated with resins, pigment derivatives, or the like).

Examples of the organic pigments and inorganic pigments include yellow pigments, red pigments, magenta pigments, blue pigments, cyan pigments, green pigments, orange pigments, violet pigments, brown pigments, black pigments, and white pigments.

In such a case of using, as the coloring agent, a pigment, a pigment dispersing agent may be used as needed.

In the case of using, as the coloring agent, a pigment, a self-dispersible pigment having hydrophilic groups on the surfaces of the pigment particles may be used as the pigment.

For the coloring agent and the pigment dispersing agent, reference can be appropriately made to Paragraphs 0180 to 0200 of JP2014-040529A and Paragraphs 0122 to 0129 of WO2016/052053A.

When the ink according to the present disclosure contains a coloring agent, the content of the coloring agent relative to the total ink amount is preferably 0.1 mass % to 20 mass %, more preferably 0.5 mass % to 10 mass %, particularly preferably 0.5 mass % to 5 mass %.

Other Component

The ink according to the present disclosure may contain, as needed, in addition to the above-described components, another component.

The other component may be included in the specified particles or may not be included in the specified particles.

The ink according to the present disclosure may contain, as a component that may be included in the specified particles or may not be included in the specified particles, a surfactant, a polymerization inhibitor, or an ultraviolet absorbent, for example.

The ink according to the present disclosure may contain, as needed, outside of the specified particles, a water-soluble polymerizable monomer, a water-soluble photopolymerization initiator, or a water-soluble resin, for example.

For these components, for example, reference can be made to Paragraphs 0134 to 0157 of WO2016/052053A.

Preferred Method for Producing Ink

The method for producing the ink according to the present disclosure is not particularly limited, but preferably is an embodiment including:
  a step of producing an aqueous dispersion of specified particles by the above-described method for producing an aqueous dispersion (the production method A or the production method B); and
  a step of adding, to the aqueous dispersion of the specified particles, another component such as a pigment or a water-soluble organic solvent and performing mixing.

Another embodiment of the method for producing the ink according to the present disclosure may be an embodiment of performing a step of performing the above-described method for producing an aqueous dispersion (the production method A or the production method B) to produce an aqueous dispersion of specified particles, to thereby directly produce an ink being the aqueous dispersion of the specified particles (in other words, a method in which no other components are added to the aqueous dispersion of the specified particles).

Preferred Properties of Ink

For the ink according to the present disclosure, the ink set at 25° C. to 50° C. preferably has a viscosity of 3 mPa·s to 15 mPa·s, more preferably 3 mPa·s to 13 mPa·s. In particular, for the ink according to the present disclosure, the ink set at 25° C. preferably has a viscosity of 50 mPa·s or less. When the ink has a viscosity in such a range, higher ejection stability can be achieved.

Note that the viscosity of the ink is a value measured using a viscometer.

As the viscometer, for example, a VISCOMETER TV-22 (Toki Sangyo Co., Ltd.) can be employed.

EXAMPLES

Hereinafter, the present invention will be specifically described with reference to Examples; however, the present invention is not limited to the following Examples.

Hereafter, "parts" represent parts by mass unless otherwise specified.

Preparation of Polymer P

As the polymers P included in the specified particles, Polymers P1 to P4 were prepared.

Detailed descriptions are as follows.

Preparation of Polymer P1

Into a three-neck flask,
  2,2-dimethylolpropionic acid (DMPA) (10.79 g) serving as a hydrophilic-group-introducing compound,
  HMDI (61.84 g) serving as an isocyanate compound,
  Compound (24) (16.57 g) and Compound (38) (29.14 g) serving as diol compounds,
  2-t-butyl-1,4-benzoquinone (0.003 g) serving as a polymerization inhibitor, and
  ethyl acetate (74.89 g) serving as an organic solvent
were charged and heated to 70° C.

To this, 0.178 g of NEOSTANN U-600 (manufactured by Nitto Kasei Co., Ltd., inorganic bismuth catalyst; hereafter, also referred to as "U-600") was added, and stirring was performed at 70° C. for 7 hours.

Subsequently, to this, ethyl acetate (114.39 g) and isopropyl alcohol (82.84 g) were added and stirring was performed at 70° C. for 3 hours. After the stirring for 3 hours, cooling to 50° C. was performed, diisopropylethylamine (9.36 g) was added, and stirring for 1 hour was performed. The reaction solution was left to cool to room temperature and subjected to adjustment of the concentration using ethyl acetate, to thereby obtain a 30 mass % solution of Polymer P1 (the solvent was a mixed solution of ethyl acetate/isopropyl alcohol).

Polymer P1 was found to have a Mw of 12,000 and an acid value of 0.68 mmol/g.

Preparation of Polymer P2

Into a three-neck flask,
2,2-dimethylolpropionic acid (DMPA) (10.94 g) serving as a hydrophilic-group-introducing compound,
IPDI (58.22 g) serving as an isocyanate compound,
Compound (24) (21.04 g) and Compound (38) (29.65 g) serving as diol compounds,
2-t-butyl-1,4-benzoquinone (0.003 g) serving as a polymerization inhibitor, and
methyl ethyl ketone (77.91 g) serving as an organic solvent
were charged and heated to 70° C.

To this, 0.180 g of U-600 was added and stirring was performed at 70° C. for 7 hours.

Subsequently, to this, methyl ethyl ketone (117.86 g) and isopropyl alcohol (83.90 g) were added, and stirring was performed at 70° C. for 3 hours. After the stirring for 3 hours, cooling to 50° C. is performed, diisopropylethylamine (10.02 g) was added, and stirring for 1 hour was performed. The reaction solution was left to cool to room temperature, and subjected to adjustment of the concentration using methyl ethyl ketone, to thereby obtain a 30 mass % solution of Polymer P2 (the solvent was a mixed solution of methyl ethyl ketone/isopropyl alcohol).

Polymer P2 was found to have a Mw of 12,000 and an acid value of 0.68 mmol/g.

Preparation of Polymer P3

Into a three-neck flask,
2,2-dimethylolpropionic acid (DMPA) (10.72 g) serving as a hydrophilic-group-introducing compound,
IPDI (37.26 g) serving as an isocyanate compound,
Compound (18) (manufactured by Asahi Kasei Corporation, DURANOL T5652) (40.39 g) and Compound (38) (29.03 g) serving as diol compounds,
2-t-butyl-1,4-benzoquinone (0.003 g) serving as a polymerization inhibitor, and
methyl ethyl ketone (76.27 g) serving as an organic solvent
were charged and heated to 70° C.

To this, 0.176 g of U-600 was added and stirring was performed at 70° C. for 7 hours.

Subsequently, to this, methyl ethyl ketone (115.49 g) and isopropyl alcohol (82.18 g) were added, and stirring at 70° C. for 3 hours was performed. After the stirring for 3 hours, cooling to 50° C. is performed, diisopropylethylamine (9.81 g) was added, and stirring for 1 hour was performed. The reaction solution was left to cool to room temperature, and subjected to adjustment of the concentration using methyl ethyl ketone, to thereby obtain a 30 mass % solution of Polymer P3 (the solvent was a mixed solution of methyl ethyl ketone/isopropyl alcohol).

Polymer P3 was found to have a Mw of 12,000 and an acid value of 0.68 mmol/g.

Preparation of Polymer P4

Into a three-neck flask,
2,2-dimethylolpropionic acid (DMPA) (11.06 g) serving as a hydrophilic-group-introducing compound,
IPDI (39.59 g) serving as an isocyanate compound,
Compound (18) (manufactured by Asahi Kasei Corporation, DURANOL T5652) (24.79 g), Compound (38) (29.97 g), and SILAPLANE FM-DA11 (manufactured by JNC CORPORATION; diol compound including polysiloxane bonds) (15.76 g) serving as diol compounds,
2-t-butyl-1,4-benzoquinone (0.003 g) serving as a polymerization inhibitor, and
methyl ethyl ketone (78.78 g) serving as an organic solvent
were charged and heated to 70° C.

To this, 0.182 g of U-600 was added, and stirring was performed at 70° C. for 7 hours.

Subsequently, to this, methyl ethyl ketone (119.13 g) and isopropyl alcohol (84.82 g) were added, and stirring at 70° C. for 3 hours was performed. After the stirring for 3 hours, cooling to 50° C. is performed, diisopropylethylamine (10.12 g) was added, and stirring for 1 hour was performed. The reaction solution was left to cool to room temperature, and subjected to adjustment of the concentration using methyl ethyl ketone, to thereby obtain a 30 mass % solution of Polymer P4 (the solvent was a mixed solution of methyl ethyl ketone/isopropyl alcohol).

Polymer P4 was found to have a Mw of 12,000 and an acid value of 0.68 mmol/g.

Example 1

Preparation of Aqueous Dispersion of Specified Particles
Preparation of Oil-Phase Component The 30 mass % solution of Polymer P1 (66.7 g),
SR295 serving as a polymerizable monomer M (21.5 g),
IRGACURE (registered trademark) 819 serving as a photopolymerization initiator (1.5 g),
ITX (isopropylthioxanthone) serving as a sensitizer (0.25 g), and
ethyl acetate (36.7 g)
were mixed together and stirred at room temperature for 30 minutes, to obtain an oil-phase component.

SR295 is a tetrafunctional radical-polymerizable monomer and is specifically pentaerythritol tetraacrylate (molecular weight: 352). SR295 is classified as the monomer (M-1) and is classified as, of the monomer (M-1), the monomer (M1B) (specifically, the monomer (M-1) other than the monomer (M1A)) (refer to Table 1-1-1).

IRGACURE (registered trademark) 819 is an acylphosphine oxide-based radical polymerization initiator and is specifically bis(2,4,6-trimethylbenzoyl)-phenylphosphine oxide.

Preparation of Aqueous-Phase Component

As an aqueous-phase component, distilled water (140 g) was prepared.

Preparation of Aqueous Dispersion of Specified Particles

The oil-phase component and the aqueous-phase component were mixed together and the resultant mixture was emulsified at room temperature using a homogenizer at 7000 rpm (revolution per minute) for 30 minutes, to obtain an emulsion.

The obtained emulsion was added to distilled water (60 g); the resultant liquid was heated to 50° C., and stirred at 50° C. for 5 hours, to thereby distill off, from the liquid, the solvent (in Example 1, ethyl acetate and isopropyl alcohol).

The liquid from which the solvent had been distilled off was diluted with distilled water so as to have a total solid content of 20 mass %, to thereby obtain an aqueous dispersion of specified particles.

The specified particles were found to have a volume-average dispersion particle size of 70 nm.
Preparation of Ink
The components of the following composition were mixed together to prepare an ink.
Composition of Ink
   The aqueous dispersion of specified particles (total solid content of specified particles: 20 mass %):
      50 parts
   Pigment dispersion liquid (Pro-jet Cyan APD1000 (manufactured by FUJIFILM Imaging Colorants), pigment concentration: 14 mass %):
      15 parts
   Fluorine-based surfactant (manufactured by E. I. du Pont de Nemours and Company, Capstone FS-31, solid content: 25 mass %):
      0.3 parts
   Propylene glycol (PG):
      15 parts
   Water:
      the remainder of 100 parts in total In the ink (specifically, the ink to be ejected), the total solid content of the specified particles is 10 mass %. In this Example, this value was regarded as the total solid content of the specified particles in the ink being landed (refer to Table 1-1-1).
Image Recording
An ink cartridge of an ink jet recording apparatus (product name "DMP-2850", manufactured by FUJIFILM Corporation) was filled with the above-described ink, and an image was recorded in the following manner on a PVC (polyvinyl chloride) film serving as a substrate.

As the PVC film (substrate), "AVERY (registered trademark) 400 GLOSS WHITE PERMANENT" manufactured by AVERY DENNISON CORPORATION was employed.

The substrate was heated such that a surface to which the ink was to be applied (in other words, a surface to which the ink was to be landed) had a temperature of 50° C. (preheating step). This preheating was performed using, in DMP-2850, a platen heater disposed on the upstream side in the substrate transport direction relative to the ink jet head.

Onto the heated substrate, the ink was ejected from the ink jet head of the ink jet recording apparatus and applied (application step). The ink ejection conditions were set to 900 dpi (dots per inch) and 10 pL per dot. The ink was applied while heating of the substrate was maintained, so that the ink was landed to the surface of the substrate, the surface being maintained at 50° C. The heating of the substrate during application of the ink was maintained using a platen heater disposed, in DMP-2850, under the ink jet head (namely, in the ink application region).

The ink having been applied onto the substrate was irradiated with (in other words, exposed to) UV light (peak wavelength: 395 nm) from a 395 nm LED lamp (product name "PEL UV CURE UNIT", manufactured by PRINTED ELECTRONICS LIMITED) disposed near the ink jet head (irradiation step). The irradiation energy of the UV light was set to 1000 mJ/cm$^2$.

The time from landing of the ink to exposure (specifically, the time from landing of the ink onto the substrate to the starting of irradiation with UV light) was controlled to be 0.10 seconds (refer to Table 1-1-2).

Subsequently, the exposed ink was heat-dried under conditions of 50° C. and 180 seconds, to obtain an image (drying step). The ink was heat-dried by bringing a surface of the substrate, the surface being on a side opposite from the ink application surface, into contact with a hot plate.

Measurements and Evaluations
The ink obtained above was used and the following measurements and evaluations were performed.
The results will be described in Table 1-1-2 and Table 2.
Total Solid Content of Specified Particles in Ink at Starting of Exposure
A FTA-1000 contact angle meter and a hot-water-circulation temperature-control stage manufactured by FTA, Inc. were used and the above-described method was performed to determine the total solid content (mass %) of specified particles in the ink at the starting of exposure.
Residual Liquid-Component Content
The above-described method was performed to determine the residual liquid-component content (mass %) in the irradiation step (specifically, the content (mass %) of the liquid component in the ink after irradiation with the actinic energy ray relative to the content of the liquid component in the ink before irradiation with the actinic energy ray).

The above-described method was performed to determine the residual liquid-component content (mass %) in the drying step (specifically, in the drying step, the content (mass %) of the liquid component in the ink after heat-drying relative to the content of the liquid component in the ink before heat-drying).
Image Quality
The above-described ink having been stored at room temperature from the preparation within 1 day was used and the character image illustrated in FIG. 1 was recorded, under the above-described image recording conditions, at sizes of 5 points, 6 points, and 7 points.

The character images of the sizes were observed using a craft loupe at a magnification of 10× (manufactured by ETSUMI CO., LTD.). On the basis of observation results, image sharpness was evaluated in accordance with evaluation ranks below. Of the evaluation ranks below, A is the highest rank in terms of image quality of the image.
Evaluation Ranks of Image Quality of Image
   A: The character image corresponding to FIG. 1 and having the size of 5 points was formed without illegible lettering or bleeding.
   B: The character image corresponding to FIG. 1 and having the size of 6 points was formed without illegible lettering or bleeding (however, B excludes cases evaluated as A).
   C: The character image corresponding to FIG. 1 and having the size of 7 points was formed without illegible lettering or bleeding (however, C excludes cases evaluated as A and B).
   D: The character image corresponding to FIG. 1 and having the size of 7 points was formed with illegible lettering or bleeding.
Wear Resistance (Dry)
The above-described ink having been stored at room temperature from the preparation within 1 day was used and a solid image was recorded on a substrate (PVC film) under the above-described image recording conditions.

The solid image formed on the substrate was subjected to a rubbing test under the following conditions. As the canvas, a dry canvas was used.
   Testing apparatus: abrasion resistance testing machine for paperboard (JIS P-8136) from Nihon T.M.C. Corporation
   Type of canvas: canvas No. 6 (manufactured by TAKEYARI CO., LTD.)
   Number of rubbing: 500 times
   Load: 500 gf After the rubbing test, the density of the cyan transferred onto the canvas (hereafter, referred to as "transfer OD") was measured with a Spectrophotometer CM-25cG (manufactured by KONICA MINOLTA JAPAN, INC.), and evaluated in accordance with evaluation ranks below and in terms of wear resistance (dry) of the solid image. Of the following evaluation ranks, A is the highest rank in terms of the wear resistance (dry) of the image.

Evaluation Ranks of Wear Resistance (Dry)
  A: The transfer OD was 0 or more and less than 0.03.
  B: The transfer OD was 0.03 or more and less than 0.1.
  C: The transfer OD was 0.1 or more and less than 0.2.
  D: The transfer OD was 0.2 or more.

Wear Resistance (Water)

The same evaluation as in Wear resistance (dry) was performed except that the dry canvas was replaced by a canvas moistened with water.

Wear Resistance (IPA)

The same evaluation as in Wear resistance (dry) was performed except that the dry canvas was replaced by a canvas moistened with isopropyl alcohol (IPA).

Stickiness of Image

In accordance with the procedures of image recording, a solid image having the shape of 5 cm×5 cm square was recorded on a substrate, to obtain a recorded product.

On the image-recorded surface of the obtained recorded product, an A6-size PVC film (hereafter, referred to as "PVC film 2") was placed. A load of 300 g/cm$^2$ was applied onto the PVC film 2 placed on the image-recorded surface; this state was held at 40° C. for 24 hours. As the PVC film 2, a PVC film similar to that serving as the substrate was employed.

After 24 hours elapsed, the recorded product and the PVC film 2 were separated from each other; the solid image in the recorded product was visually observed, and the blocking resistance of the image was evaluated in accordance with evaluation ranks below.

Of the evaluation ranks below, "A" is the highest rank in terms of suppression of stickiness of the image.

Evaluation Ranks of Stickiness of Image
  A: Peeling and a decrease in the density of the image are not visually observed.
  B: In at least a portion of the image, a decrease in the density is visually observed, but peeling of the image is not visually observed.
  C: Peeling of the image is visually observed and the area of the peeling accounts for more than 0% and less than 5% of the area of the image at the time of recording (25 cm$^2$).
  D: Peeling of the image is visually observed and the area of the peeling accounts for 5% or more of the area of the image at the time of recording (25 cm$^2$).

Adhesiveness of Image

The above-described ink having been stored at room temperature from the preparation within 1 day was used and a solid image was recorded on a substrate (PVC film) under the above-described image recording conditions.

The obtained solid image was subjected to a cross-hatch test in accordance with ISO2409 (2013) (cross-cut method), and evaluated in accordance with evaluation ranks below and in terms of adhesiveness of the solid image to the substrate.

In this cross-hatch test, the cutting pitch was set to 1 mm, and a lattice of 25 squares having 1 mm sides was formed. Of the evaluation ranks below, A is the highest rank in terms of the adhesiveness of the solid image.

In the evaluation ranks below, the flaking square ratios (%) are values determined by the following formula. In the following formula, the total number of squares is 25.

Flaking square ratio (%)=[(Number of flaking squares)/(Total number of squares)]×100

Evaluation Ranks of Adhesiveness of Image
  A: The flaking square ratio (%) was 0% or more and 5% or less.
  B: The flaking square ratio (%) was more than 5% and 15% or less.
  C: The flaking square ratio (%) was more than 15% and 35% or less.
  D: The flaking square ratio (%) was more than 35%.

Ejection Performance of Ink

The above-described ink having been stored at room temperature within 1 day from the preparation was ejected from the ink jet head of the above-described ink jet recording apparatus for 30 minutes, and then the ejection was terminated.

After the lapse of 5 minutes from the termination of ejection, the ink was again ejected from the head onto the above-described substrate, to form 5 cm×5 cm solid images.

The images were visually observed to inspect for missing dots due to, for example, nozzles turned into a non-ejection state, and evaluated in terms of ink ejection performance and in accordance with the evaluation ranks below.

Of the following evaluation ranks, A is the highest rank in terms of the ink ejection performance.

Evaluation Ranks of Ejection Performance
  A: Missing dots due to, for example, nozzles turned into a non-ejection state were not observed and good images were obtained.
  B: A small number of missing dots due to, for example, nozzles turned into a non-ejection state were observed, but they did not cause practical problems.
  C: Missing dots due to, for example, nozzles turned into a non-ejection state occurred and the images were not practically usable.
  D: Ejection from the head was not achieved.

Examples 2 to 4

The same procedures as in Example 1 were performed except that, in the preparation of the aqueous dispersion of the specified particles, the 30 mass % solution (66.7 g) of Polymer P1 was changed to the 30 mass % solution (66.7 g) of Polymer P2, the 30 mass % solution (66.7 g) of Polymer P3, or the 30 mass % solution (66.7 g) of Polymer P4, to thereby change Polymer P1 in the specified particles to the corresponding one of Polymers P2 to P4.

The results will be described in Table 1-1-2 and Table 2.

Examples 5 and 18 to 20 and Comparative Example 1

The same procedures as in Example 1 were performed except that the species of the polymerizable monomer M was changed as described in Tables 1-1-1 and 1-2-1.

In Examples 18 to 20, two species of the polymerizable monomer M were used in contents described in Table 1-2-1.

In Comparative Example 1, a monomer (M-2) (specifically, a polymerizable monomer M other than the monomer (M-1)) was used.

The results will be described in Tables 1-1-2 and 1-2-2 and Table 2.

Examples 6, 7, 12, and 13

The same procedures as in Example 5 were performed except that the substrate temperature at landing of the ink and the substrate temperature at application of the ink were changed to the temperatures in the "Substrate temperature at landing of ink" column in Table 1-1-2.

The results will be described in Table 1-1-2 and Table 2.

Examples 8 and 9 and Comparative Example 4

The same procedures as in Example 5 were performed except that the time from landing of the ink to the starting of exposure was changed as described in Tables 1-1-2 and 1-2-2.

The results will be described in Tables 1-1-2 and 1-2-2 and Table 2.

Examples 10 and 11 and Comparative Examples 2 and 3

The same procedures as in Example 5 were performed except that, without changing the total amount of the polymerizable monomer M and the polymer P, the polymerizable monomer M content and the polymer P content were changed as described in Tables 1-1-1 and 1-2-1.

The results will be described in Tables 1-1-2 and 1-2-2 and Table 2.

Example 14

The same procedures as in Example 5 were performed except that the substrate temperature at landing of the ink and the substrate temperature at application of the ink were changed to the temperatures described in the "Substrate temperature at landing of ink" column in Table 1-2-2, and the time from landing of the ink to the starting of exposure was changed as described in Table 1-2-2.

The results will be described in Table 1-2-2 and Table 2.

Examples 15 and 16

The same procedures as in Example 5 were performed except that the post-exposure heat-drying temperature (hereafter, also referred to as post-exposure heating temperature) was changed as described in Table 1-2-2.

The results will be described in Table 1-2-2 and Table 2.

Example 17

The same procedures as in Example 16 were performed except that the time of the post-exposure heat-drying was shortened to thereby change the residual liquid-component content in the drying step as described in Table 1-2-2.

The results will be described in Table 1-2-2 and Table 2.

TABLE 1-1-1

| | Polymerizable monomer M | | | | Polymer P | | |
|---|---|---|---|---|---|---|---|
| | Species | Viscosity (mPa·s) | Large classification | Small classification | Content relative to total solid content of specified particles (mass %) | Species | Content relative to total solid content of specified particles (mass %) | Total solid content of specified particles in ink being landed (mass %) |
| Example 1  | SR295  | 342 | M-1 | M1B | 50 | P1 | 46 | 10 |
| Example 2  | SR295  | 342 | M-1 | M1B | 50 | P2 | 46 | 10 |
| Example 3  | SR295  | 342 | M-1 | M1B | 50 | P3 | 46 | 10 |
| Example 4  | SR295  | 342 | M-1 | M1B | 50 | P4 | 46 | 10 |
| Example 5  | SR833S | 130 | M-1 | M1A | 50 | P1 | 46 | 10 |
| Example 6  | SR833S | 130 | M-1 | M1A | 50 | P1 | 46 | 10 |
| Example 7  | SR833S | 130 | M-1 | M1A | 50 | P1 | 46 | 10 |
| Example 8  | SR833S | 130 | M-1 | M1A | 50 | P1 | 46 | 10 |
| Example 9  | SR833S | 130 | M-1 | M1A | 50 | P1 | 46 | 10 |
| Example 10 | SR833S | 130 | M-1 | M1A | 40 | P1 | 56 | 10 |
| Example 11 | SR833S | 130 | M-1 | M1A | 70 | P1 | 26 | 10 |
| Example 12 | SR833S | 130 | M-1 | M1A | 50 | P1 | 46 | 10 |
| Example 13 | SR833S | 130 | M-1 | M1A | 50 | P1 | 46 | 10 |

TABLE 1-1-2

| | Substrate temperature at landing of ink (° C.) | Total solid content of specified particles in ink at starting of exposure (mass %) | Time from landing of ink to starting of exposure | Post-exposure heating temperature (° C.) | Residual liquid-component content in irradiation step (mass %) | Residual liquid-component content in drying step (mass %) |
|---|---|---|---|---|---|---|
| Example 1 | 50 | 11 | 0.10 | 50 | 56 | 30 |
| Example 2 | 50 | 11 | 0.10 | 50 | 56 | 30 |
| Example 3 | 50 | 11 | 0.10 | 50 | 56 | 30 |
| Example 4 | 50 | 11 | 0.10 | 50 | 56 | 30 |
| Example 5 | 50 | 11 | 0.10 | 50 | 56 | 30 |
| Example 6 | 25 | 10 | 0.10 | 50 | 77 | 50 |

TABLE 1-1-2-continued

|  | Substrate temperature at landing of ink (° C.) | Total solid content of specified particles in ink at starting of exposure (mass %) | Time from landing of ink to starting of exposure | Post-exposure heating temperature (° C.) | Residual liquid-component content in irradiation step (mass %) | Residual liquid-component content in drying step (mass %) |
|---|---|---|---|---|---|---|
| Example 7 | 40 | 11 | 0.10 | 50 | 65 | 40 |
| Example 8 | 50 | 14 | 0.50 | 50 | 56 | 30 |
| Example 9 | 50 | 17 | 1.00 | 50 | 56 | 30 |
| Example 10 | 50 | 11 | 0.10 | 50 | 56 | 30 |
| Example 11 | 50 | 11 | 0.10 | 50 | 56 | 30 |
| Example 12 | 70 | 14 | 0.10 | 50 | 30 | 20 |
| Example 13 | 75 | 16 | 0.10 | 50 | 20 | 10 |

TABLE 1-2-1

|  | Polymerizable monomer M | | | | Polymer P | | Total solid content of specified particles in ink being landed (mass %) |
|---|---|---|---|---|---|---|---|
|  | Species | Viscosity (mPa · s) | Large classification | Small classification | Content relative to total solid content of specified particles (mass %) | Species | Content relative to total solid content of specified particles (mass %) |
| Example 14 | SR833S | 130 | M-1 | M1A | 50 | P1 | 46 | 10 |
| Example 15 | SR833S | 130 | M-1 | M1A | 50 | P1 | 46 | 10 |
| Example 16 | SR833S | 130 | M-1 | M1A | 50 | P1 | 46 | 10 |
| Example 17 | SR833S | 130 | M-1 | M1A | 50 | P1 | 46 | 10 |
| Example 18 | SR833S | 130 | M-1 | M1A | 25 | P1 | 46 | 10 |
|  | OTA480 | 100 | M-1 | M1A | 25 |  |  |  |
| Example 19 | SR833S | 130 | M-1 | M1A | 25 | P1 | 46 | 10 |
|  | CD595 | 15 | M-1 | M1A | 25 |  |  |  |
| Example 20 | SR833S | 130 | M-1 | M1A | 25 | P1 | 46 | 10 |
|  | FA512M | 20 | M-1 | M1A | 25 |  |  |  |
| Comparative Example 1 | SR444 | 520 | M-2 | — | 50 | P1 | 46 | 10 |
| Comparative Example 2 | SR833S | 130 | M-1 | M1A | 20 | P1 | 76 | 10 |
| Comparative Example 3 | SR833S | 130 | M-1 | M1A | 85 | P1 | 11 | 10 |
| Comparative Example 4 | SR833S | 130 | M-1 | M1A | 50 | P1 | 46 | 10 |

TABLE 1-2-2

|  | Substrate temperature at landing of ink (° C.) | Total solid content of specified particles in ink at starting of exposure (mass %) | Time from landing of ink to starting of exposure | Post-exposure heating temperature (° C.) | Residual liquid-component content in irradiation step (mass %) | Residual liquid-component content in drying step (mass %) |
|---|---|---|---|---|---|---|
| Example 14 | 75 | 21 | 1.00 | 50 | 20 | 5.0 |
| Example 15 | 50 | 11 | 0.10 | 25 | 56 | 60 |
| Example 16 | 50 | 11 | 0.10 | 90 | 56 | 1.0 |
| Example 17 | 50 | 11 | 0.10 | 90 | 56 | 2.0 |
| Example 18 | 50 | 11 | 0.10 | 50 | 56 | 30 |
| Example 19 | 50 | 11 | 0.10 | 50 | 56 | 30 |
| Example 20 | 50 | 11 | 0.10 | 50 | 56 | 30 |
| Comparative Example 1 | 50 | 11 | 0.10 | 50 | 56 | 30 |
| Comparative Example 2 | 50 | 11 | 0.10 | 50 | 56 | 30 |
| Comparative Example 3 | 50 | 11 | 0.10 | 50 | 56 | 30 |
| Comparative Example 4 | 50 | 11 | 2.00 | 50 | 56 | 30 |

TABLE 2

| | Evaluation results | | | | | | |
|---|---|---|---|---|---|---|---|
| | Image quality | Wear resistance (dry) | Wear resistance (water) | Wear resistance (IPA) | Stickiness | Adhesiveness | Ejection performance |
| Example 1 | B | B | A | B | B | B | A |
| Example 2 | B | B | A | B | B | B | A |
| Example 3 | B | B | A | B | B | B | A |
| Example 4 | B | B | A | B | B | B | A |
| Example 5 | A | A | A | A | A | A | A |
| Example 6 | B | A | A | A | A | A | A |
| Example 7 | A | A | A | A | A | A | A |
| Example 8 | A | A | A | A | A | A | A |
| Example 9 | A | A | A | A | A | A | A |
| Example 10 | A | A | A | A | A | A | A |
| Example 11 | A | A | A | A | A | A | A |
| Example 12 | A | A | A | A | A | A | A |
| Example 13 | B | A | A | A | A | A | A |
| Example 14 | B | A | A | B | A | A | A |
| Example 15 | A | B | B | B | B | B | A |
| Example 16 | A | A | A | A | A | B | A |
| Example 17 | A | A | A | A | A | A | A |
| Example 18 | A | A | A | A | A | A | A |
| Example 19 | A | A | A | A | A | A | A |
| Example 20 | A | A | A | A | A | A | A |
| Comparative Example 1 | D | D | D | D | C | C | A |
| Comparative Example 2 | D | D | D | D | B | C | A |
| Comparative Example 3 | D | D | D | D | C | C | C |
| Comparative Example 4 | D | B | B | B | B | C | A |

Descriptions of Tables 1-1-1 and 1-2-1

For the components in the inks, only the polymer P and the polymerizable monomer M in the specified particles are described and the other components in the ink are omitted.

The abbreviations of the polymerizable monomer M mean the following.

SR295: pentaerythritol tetraacrylate manufactured by Sartomer
SR833S: tricyclodecanedimethanol diacrylate manufactured by Sartomer
OTA480: glycerol propoxy triacrylate manufactured by DAICEL-ALLNEX LTD.
CD595: 1,10-decanediol diacrylate manufactured by Sartomer
FA512M: dicyclopentenyloxyethyl methacrylate manufactured by Hitachi Chemical Company, Ltd.
SR444: pentaerythritol triacrylate from Sartomer As described in Tables 1-1-1 to 1-2-2, in each of Examples, an ink containing water and particles including the polymer P and the polymerizable monomer M in which the polymerizable monomer M included the monomer (M-1) having a viscosity at 25° C. of 500 mPa·s or less and the monomer (M-1) content relative to the total solid content of the particles was 25 mass % to 80 mass % was applied onto a substrate, and the ink having been applied onto the substrate was irradiated with an actinic energy ray at the timing in which the time from landing of the ink to the starting of exposure was 1.00 second or less, to obtain an image.

In each of Examples, an image having high image quality and high wear resistance was obtained.

By contrast, the results of Comparative Examples were as follows.

In Comparative Example 1 in which the polymerizable monomer M included the monomer (M-2) not being the monomer (M-1) and having a viscosity of more than 500 mPa·s, the image has low image quality and low wear resistance.

In Comparative Example 2 in which the monomer (M-1) content relative to the total solid content of the particles was less than 25 mass %, the image also has low image quality and low wear resistance.

In Comparative Example 3 in which the monomer (M-1) content relative to the total solid content of the particles was more than 80 mass %, the image also has low image quality and low wear resistance.

In Comparative Example 4 in which the time from landing of the ink to the starting of exposure was more than 1.00 second, the image has low image quality.

The results of Examples 1 and 5 have demonstrated that, when the monomer (M-1) includes the monomer (M1A) having a viscosity at 25° C. of 150 mPa·s or less (Example 5), the image has further improved image quality and further improved wear resistance.

The results of Examples 9 and 14 have demonstrated that, in Example 9 in which, at the starting of exposure, the ink has a specified particle content of 3 mass % or more and less than 20 mass %, the image has further improved image quality and further improved wear resistance.

The results of Examples 6, 7, 12, and 13 have demonstrated that, when, in the application step, a surface of the substrate, the surface being on a side of landing of the ink, has a temperature of 30° C. to 70° C. (Examples 7 and 12), the image has further improved image quality.

The results of Examples 5 and 15 have demonstrated that, when the drying step of heat-drying the exposed ink is included (Example 5), the image has further improved image quality and further improved wear resistance.

The results of Examples 16 and 17 have demonstrated that, when the residual liquid-component content in the drying step is 2.0 mass % or more (Example 17), the image has further improved adhesiveness to the substrate.

The results of Examples 5 and 15 have demonstrated that, when the residual liquid-component content in the drying step is 50 mass % or less (Example 5), the image has further improved image quality and further improved wear resistance.

The entire contents disclosed by JP2020-163386 filed in the Japan Patent Office on Sep. 29, 2020 are incorporated herein by reference.

All the documents, patent applications, and technical standards mentioned in this Specification are incorporated herein by reference to the same extent as in the case where the documents, patent applications, and technical standards are each specifically and individually described as being incorporated herein by reference.

What is claimed is:

1. An ink jet recording method comprising:
    a step of preparing an ink containing water and particles including a polymer P and a polymerizable monomer M wherein the polymerizable monomer M includes a monomer (M-1) having a viscosity at 25° C. of 500 mPa·s or less and a content of the monomer (M-1) relative to a total solid content of the particles is 25 mass % to 80 mass %;
    an application step of applying, onto a substrate, the ink by an ink jet process;
    an irradiation step of irradiating the ink having been applied onto the substrate, with an actinic energy ray; and
    a drying step of heat-drying the ink having been irradiated with the actinic energy ray,
    wherein a time from landing of the ink onto the substrate to starting of the irradiation with the actinic energy ray is 1.00 second or less, and
    wherein, in the drying step, a content of a liquid component in the ink after the heat-drying relative to a content of a liquid component of the ink before the heat-drying is 2.0 mass % to 50 mass %.

2. The ink jet recording method according to claim 1, wherein the polymer P includes a chain polymer.

3. The ink jet recording method according to claim 1, wherein the monomer (M-1) includes a monomer (MIA) having a viscosity at 25° C. of 150 mPa·s or less.

4. The ink jet recording method according to claim 1, wherein a total solid content of the particles in the ink at the starting of the irradiation with the actinic energy ray relative to a total amount of the ink at the starting of the irradiation with the actinic energy ray is 3 mass % or more and less than 20 mass %.

5. The ink jet recording method according to claim 1, wherein the substrate has a surface on a side of landing of the ink, the surface having a temperature of 30° C. to 70° C. in the application step.

6. The ink jet recording method according to claim 1, satisfying at least one of
    comprising a preheating step of heating the substrate before the application step, or
    performing, in the application step, heating of the substrate and application of the ink.

7. The ink jet recording method according to of claim 1, wherein, in the irradiation step, an irradiation energy of the actinic energy ray is 300 mJ/cm$^2$ or more, and
    a content of a liquid component in the ink after the irradiation with the actinic energy ray relative to a content of a liquid component in the ink before the irradiation with the actinic energy ray is 10 mass % or more.

* * * * *